US011600445B2

(12) United States Patent
Yokota et al.

(10) Patent No.: US 11,600,445 B2
(45) Date of Patent: Mar. 7, 2023

(54) METHOD FOR MANUFACTURING A MULTILAYER CERAMIC ELECTRONIC COMPONENT

(71) Applicant: Murata Manufacturing Co., Ltd., Nagaokakyo (JP)

(72) Inventors: Yusuke Yokota, Nagaokakyo (JP); Togo Matsui, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/016,687

(22) Filed: Sep. 10, 2020

(65) Prior Publication Data

US 2021/0090811 A1  Mar. 25, 2021

(30) Foreign Application Priority Data

Sep. 19, 2019 (JP) .............................. JP2019-170411

(51) Int. Cl.
*H01G 4/30* (2006.01)
*H01G 4/232* (2006.01)
(Continued)

(52) U.S. Cl.
CPC .............. *H01G 4/30* (2013.01); *H01G 4/232* (2013.01); *H01G 4/248* (2013.01); *H01G 4/252* (2013.01); *H01G 13/006* (2013.01)

(58) Field of Classification Search
CPC .......... H01G 4/30; H01G 4/232; H01G 4/248; H01G 4/252; H01G 13/006
See application file for complete search history.

(56) References Cited

U.S. PATENT DOCUMENTS

| 4,771,520 A * | 9/1988 | Tanaka ..................... H01G 4/30 29/25.42 |
| 8,584,332 B2 * | 11/2013 | Matsui ..................... H01G 4/002 29/25.42 |

(Continued)

FOREIGN PATENT DOCUMENTS

| CN | 101714455 A | 5/2010 |
| CN | 104465089 A * | 3/2015 ............. H01G 13/00 |

(Continued)

OTHER PUBLICATIONS

Official Communication issued in corresponding Chinese Patent Application No. 202010976878.4, dated Oct. 27, 2021.
Office Action in JP2019-170411, dated May 24, 2022, 6 pages.

*Primary Examiner* — Jeffrey T Carley
(74) *Attorney, Agent, or Firm* — Keating & Bennett, LLP

(57) ABSTRACT

A multilayer ceramic electronic component includes a multilayer body including two major surfaces opposite to each other in a layer stacking direction, two side surfaces opposite to each other in a widthwise direction orthogonal or substantially orthogonal to the layer stacking direction, and two end surfaces opposite to each other in a lengthwise direction orthogonal or substantially orthogonal to the layer stacking direction and the widthwise direction, and external electrodes provided on the two end surfaces. A method for manufacturing the multilayer ceramic capacitor component includes preparing a plurality of multilayer bodies, stacking the plurality of multilayer bodies via a binder, rotating the plurality of multilayer bodies by about 90° with the lengthwise direction defining and functioning as an axis of rotation, and providing a side gap portion; and removing the binder from the multilayer body provided with the side gap portion.

15 Claims, 17 Drawing Sheets

(51) Int. Cl.
    *H01G 13/00*    (2013.01)
    *H01G 4/248*    (2006.01)
    *H01G 4/252*    (2006.01)

(56) References Cited

U.S. PATENT DOCUMENTS

| | | | |
|---|---|---|---|
| 10,403,439 B2 * | 9/2019 | Wang | H01G 4/385 |
| 2007/0014075 A1 * | 1/2007 | Ritter | H01G 4/30 |
| | | | 361/306.3 |
| 2010/0085682 A1 | 4/2010 | Abe et al. | |
| 2011/0290542 A1 | 12/2011 | Nishisaka et al. | |
| 2012/0171001 A1 * | 7/2012 | Ogata | H01G 13/006 |
| | | | 414/222.01 |
| 2013/0056133 A1 | 3/2013 | Sato et al. | |
| 2013/0057112 A1 * | 3/2013 | Shirakawa | H01G 4/232 |
| | | | 336/200 |
| 2017/0186546 A1 * | 6/2017 | Kato | H01G 4/30 |
| 2017/0271083 A1 * | 9/2017 | Makino | H01G 4/30 |
| 2019/0318872 A1 * | 10/2019 | Mizuno | H01G 4/232 |

FOREIGN PATENT DOCUMENTS

| | | | |
|---|---|---|---|
| JP | 2000-195754 A | | 7/2000 |
| JP | W02005117041 A | * | 3/2008 |
| JP | 2013026257 A | | 2/2013 |
| JP | 2013070024 A | | 4/2013 |
| JP | 5589891 B2 | | 9/2014 |
| JP | 2016-207878 A | | 12/2016 |
| JP | 2017-188559 A | | 10/2017 |
| JP | 2018133441 A | | 8/2018 |
| JP | 2019117817 A | * | 7/2019 |
| JP | 2019149504 A | * | 9/2019 |

\* cited by examiner

FIG.4A
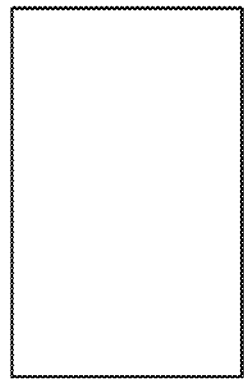
FIG.4B
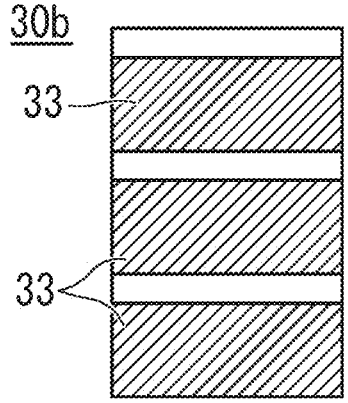
FIG.4C
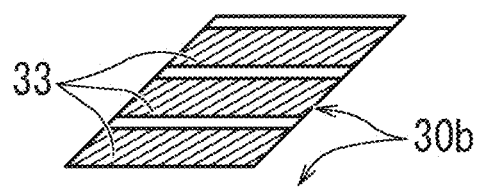
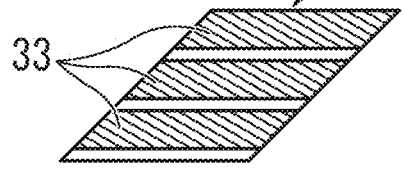
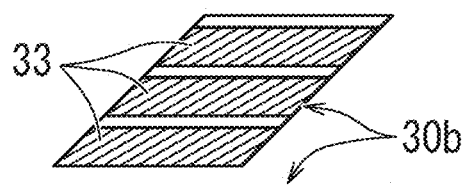
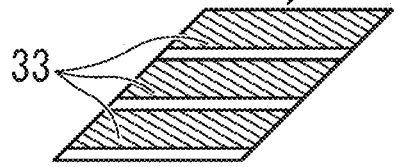
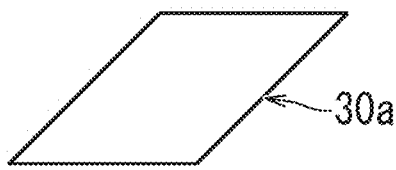

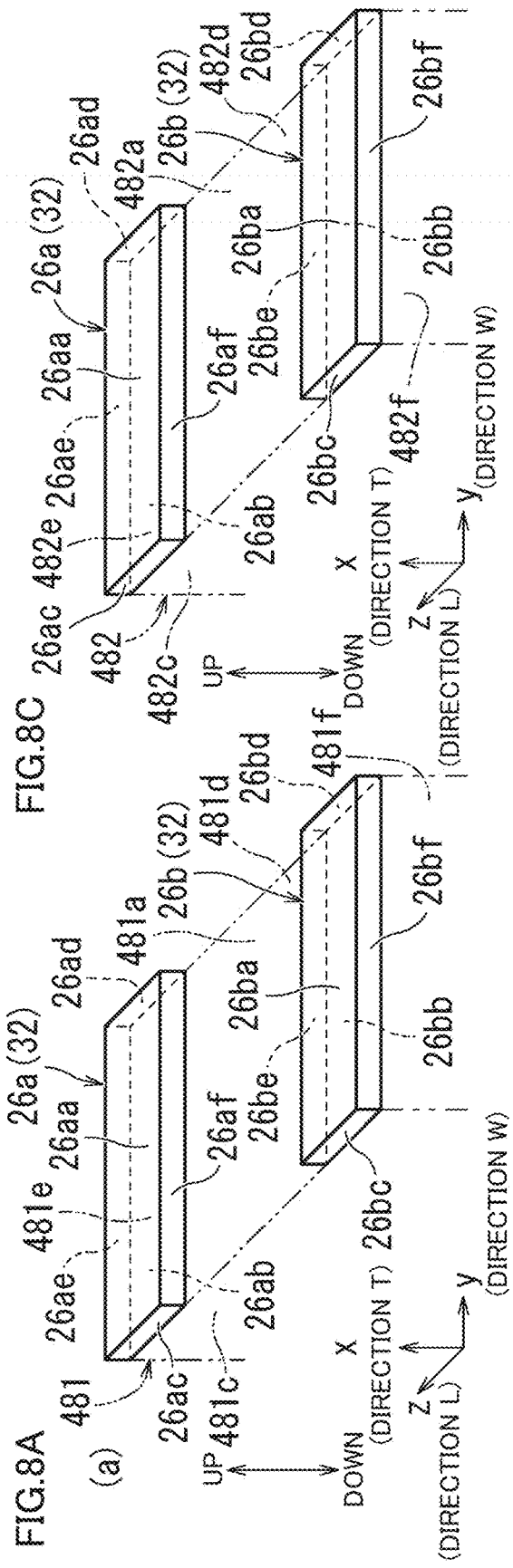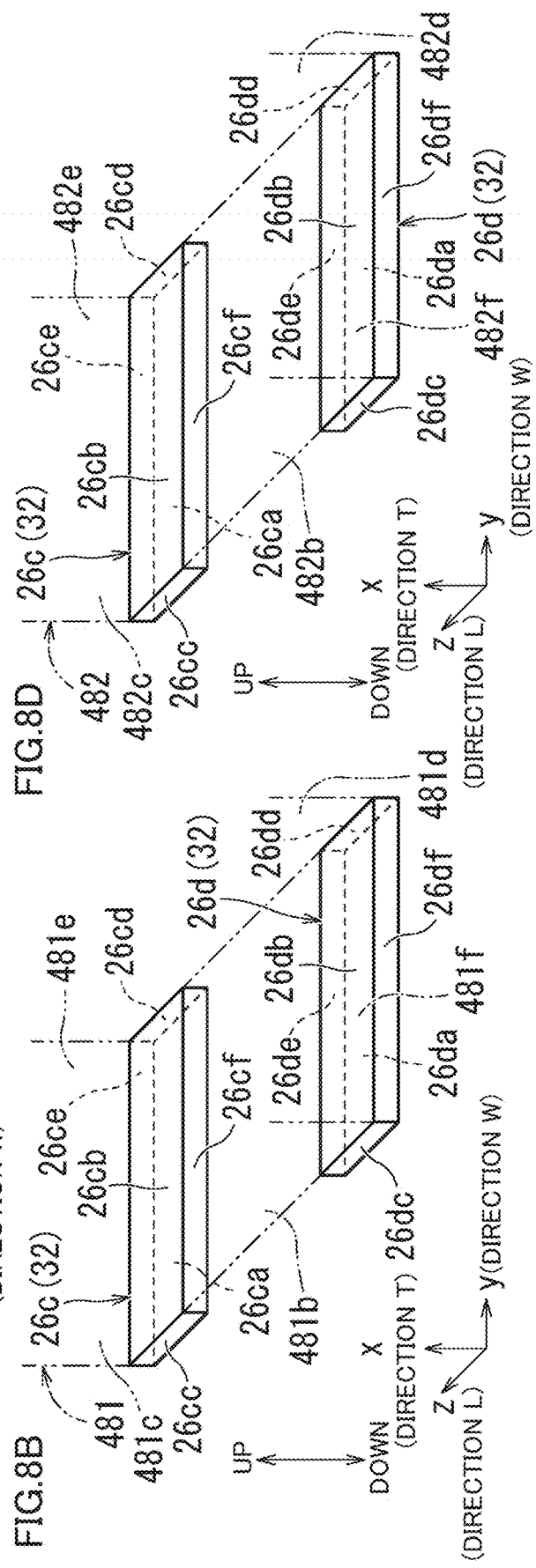

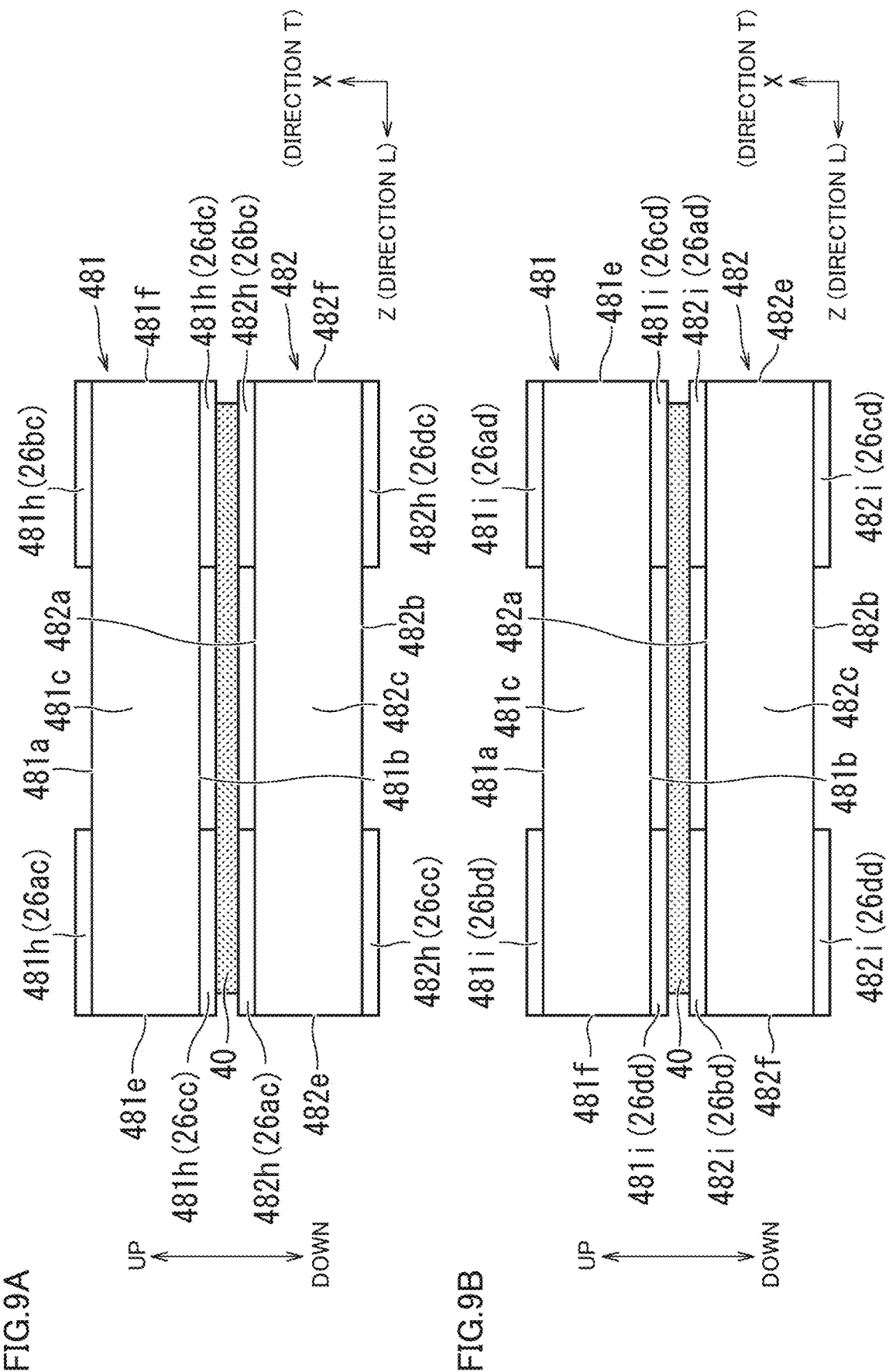

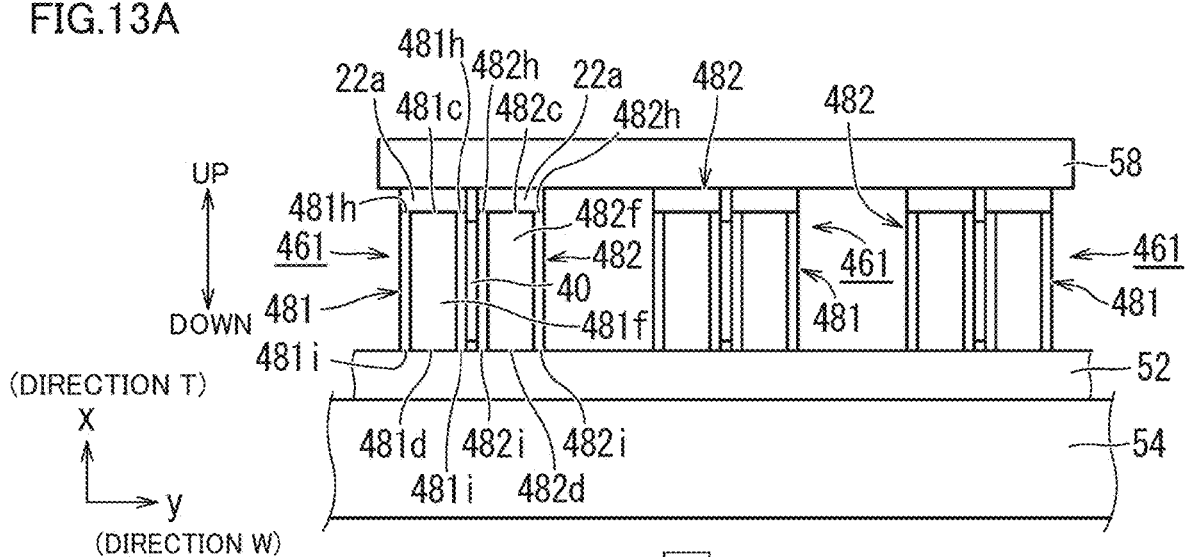
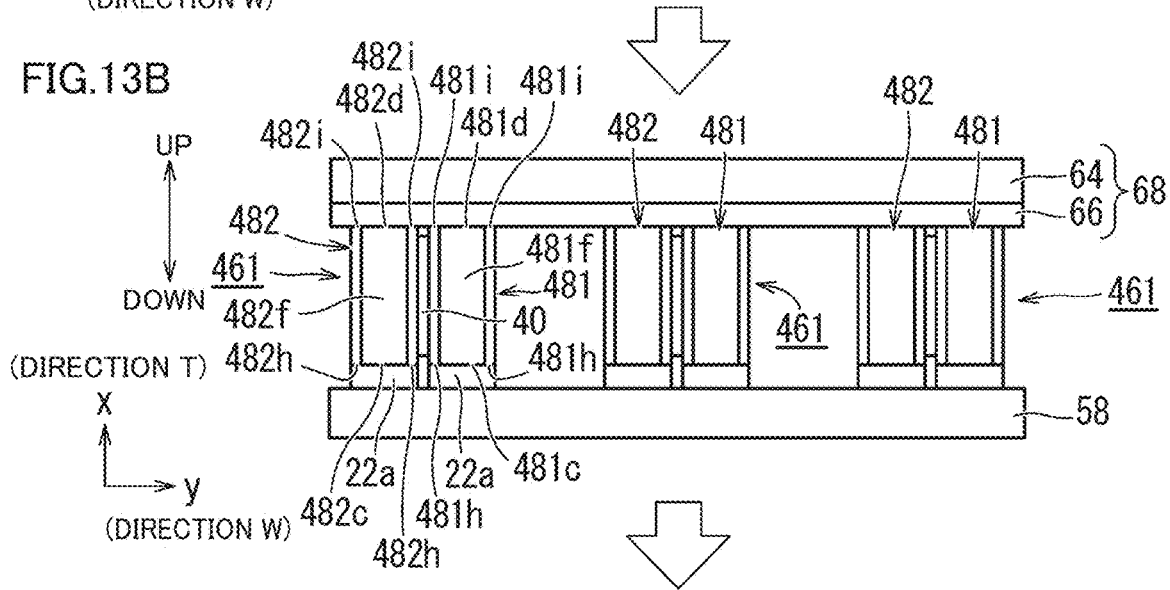
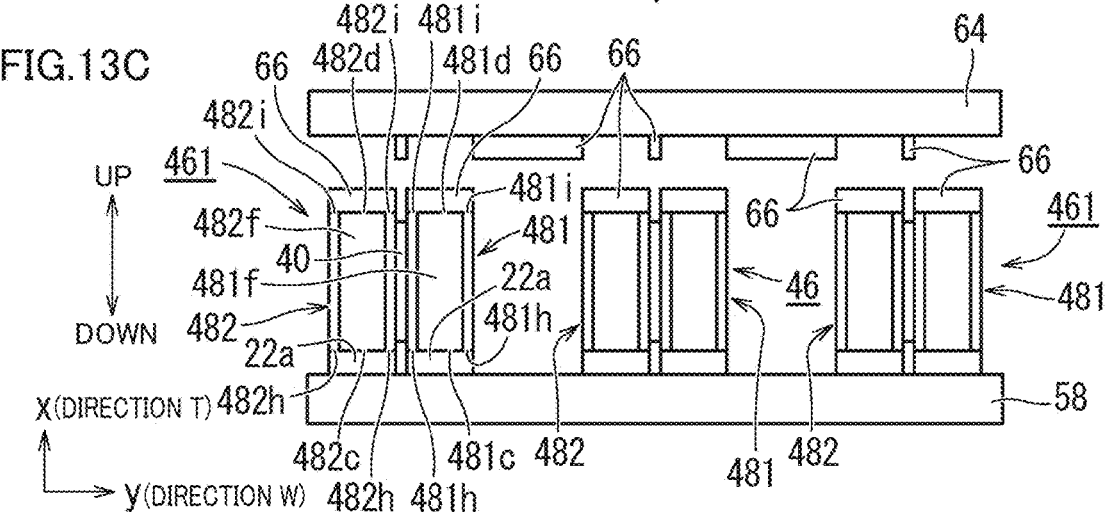

METHOD FOR MANUFACTURING A MULTILAYER CERAMIC ELECTRONIC COMPONENT

CROSS REFERENCE TO RELATED APPLICATIONS

This application claims the benefit of priority to Japanese Patent Application No. 2019-170411 filed on Sep. 19, 2019. The entire contents of this application are hereby incorporated herein by reference.

BACKGROUND OF THE INVENTION

1. Field of the Invention

The present invention relates to a method for manufacturing a multilayer ceramic electronic component and the multilayer ceramic electronic component, and more specifically to a method for manufacturing a thin multilayer ceramic electronic component and the thin multilayer ceramic electronic component.

2. Description of the Related Art

A multilayer ceramic capacitor is one type of multilayer ceramic electronic component. Such a multilayer ceramic capacitor includes a multilayer body and an external electrode. The multilayer body has a first major surface at one major surface, a second major surface at the other major surface, a first side surface at one side surface, a second side surface at the other side surface, a first end surface at one end surface, and a second end surface at the other end surface. The external electrode includes a first external electrode and a second external electrode. The multilayer body includes a ceramic layer and an internal electrode layer. The internal electrode layer includes a first internal electrode layer and a second internal electrode layer.

The first internal electrode layer and the second internal electrode layer are alternately stacked, and the first internal electrode layer externally protrudes from the first end surface and is electrically connected to the first external electrode formed on the side of the first end surface, and the second internal electrode layer externally protrudes from the second end surface and is electrically connected to the second external electrode formed on the side of the second end surface.

The ceramic layer is formed between the first major surface and the internal electrode layer, between the first internal electrode layer and the second internal electrode layer, and between the second internal electrode layer and the second major surface.

For the sake of illustration, the first and second side surfaces each have a longer side in a direction L and a shorter side in a direction T, with directions L and T being orthogonal to a direction W, and dimensions in directions L, T and W will be referred to as dimensions L, T and W, respectively, hereinafter.

In recent years, while ICs and LSIs are functionally increasingly enhanced, densely integrated, and improved in characteristics, substrates are further reduced in footprint. In such a situation, a multilayer ceramic capacitor is often mounted on a surface of or inside a semiconductor substrate. When the multilayer ceramic capacitor is thus mounted inside the semiconductor substrate, the semiconductor substrate can have a reduced footprint, and a circuit's characteristics can be improved by reducing the circuit's loop impedance.

When the multilayer ceramic capacitor is mounted inside the semiconductor substrate, a thin multilayer ceramic capacitor having dimension T smaller than dimension W is often used in order to reduce the semiconductor substrate in thickness.

Japanese Patent Laid-Open No. 2017-188559 discloses a multilayer ceramic capacitor having a first side surface and a second side surface each provided with a side gap.

Japanese Patent Laid-Open No. 2017-188559 discloses in FIGS. 8 to 11 a method for manufacturing a multilayer ceramic capacitor by forming a side gap in a method described below. That is, initially, from a state in which a multilayer chip is pressed by an adhesive sheet and a working plate, the working plate is moved in a direction perpendicular to an end surface of the multilayer chip to rotate the multilayer chip by 90° and the adhesive sheet is caused to adhere to one side surface of the multilayer chip to thus form a side gap on one side surface of the multilayer chip. Then, the multilayer chip having one side surface with the side gap formed thereon is further rotated by 180° and the adhesive sheet is caused to adhere to the other side surface of the multilayer chip to thus also form a side gap on the other side surface of the multilayer chip.

In the method for forming a side gap described in Japanese Patent Laid-Open No. 2017-188559, however, a thin multilayer chip having dimension T smaller than dimension W is not easily rotated as described above, and therefore, there is a problem in that it is difficult to form a side gap on one side surface and the other side surface.

SUMMARY OF THE INVENTION

Preferred embodiments of the present invention provide methods for manufacturing multilayer ceramic electronic components, that each allow a side gap to be more easily formed on both side surfaces even when a thin multilayer ceramic electronic component is manufactured.

Preferred embodiments of the present invention also provide thin multilayer ceramic capacitors that are each more resistant to bending by providing a side gap on both side surfaces.

A method for manufacturing a multilayer ceramic electronic component according to a preferred embodiment of the present invention is a method for manufacturing a multilayer ceramic electronic component including a multilayer body including a plurality of stacked ceramic layers and including a first major surface and a second major surface opposite to each other in a layer stacking direction, a first side surface and a second side surface opposite to each other in a widthwise direction orthogonal or substantially orthogonal to the layer stacking direction, and a first end surface and a second end surface opposite to each other in a lengthwise direction orthogonal or substantially orthogonal to the layer stacking direction and the widthwise direction, a first external electrode provided on the first end surface, and a second external electrode provided on the second end surface, the method comprising: preparing a plurality of multilayer bodies; stacking the plurality of multilayer bodies via a binder; rotating the plurality of multilayer bodies by about 90° with the lengthwise direction defining and functioning as an axis of rotation, and providing a side gap portion; and removing the binder from the multilayer body provided with the side gap portion, the multilayer ceramic electronic component having a length of a dimension T in the layer stacking direction and a length of a dimension W in the widthwise direction, the dimension T being smaller than the dimension W.

A multilayer ceramic electronic component according to a preferred embodiment of the present invention includes a multilayer body including a plurality of stacked ceramic layers and including a first major surface and a second major surface opposite to each other in a layer stacking direction, a first side surface and a second side surface opposite to each other in a widthwise direction orthogonal or substantially orthogonal to the layer stacking direction, and a first end surface and a second end surface opposite to each other in a lengthwise direction orthogonal or substantially orthogonal to the layer stacking direction and the widthwise direction, a first internal electrode layer stacked with the plurality of ceramic layers alternately and led out to the first end surface, a second internal electrode layer stacked with the plurality of ceramic layers alternately and led out to the second end surface, a first external electrode electrically connected to the first internal electrode layer and provided on the first end surface, and a second external electrode electrically connected to the second internal electrode layer and provided on the second end surface, a first side gap portion provided on a side of the first side surface at least partially in contact with an external surface of the first side surface, a second side gap portion provided on a side of the second side surface at least partially in contact with an external surface of the second side surface, the first external electrode and the second external electrode covering the first side gap portion and the second side gap portion of the first side surface and the second side surface adjacent to or in a vicinity thereof.

According to the method for manufacturing a multilayer ceramic electronic component according to a preferred embodiment of the present invention, since a plurality of multilayer bodies are stacked via a binder, the component is easily rotated, and a side gap is easily formed on both side surfaces.

The multilayer ceramic electronic component according to a preferred embodiment of the present invention includes a first side gap portion provided on the side of a first side surface at least partially in contact with the external surface of the first side surface and a second side gap portion provided on the side of a second side surface at least partially in contact with the external surface of the second side surface and includes a first external electrode and a second external electrode covering the first side gap portion and the second side gap portion of the first side surface and the second side surface adjacent to or in a vicinity thereof, and the multilayer ceramic electronic component according to a preferred embodiment of the present invention thus includes the first side surface reinforced by the first side gap portion and the second side surface reinforced by the second side gap portion. Accordingly, even when the multilayer ceramic electronic component is bent in a direction perpendicular or substantially perpendicular to the first major surface and the second major surface and thus deflected in that direction, the multilayer ceramic electronic component is able to be less likely to be damaged or destroyed.

The methods for manufacturing multilayer ceramic electronic components according to preferred embodiments of the present invention each facilitate rotating a thin multilayer ceramic electronic component to facilitate forming a side gap on a side surface.

The multilayer ceramic electronic components according to preferred embodiments of the present invention that each include a side surface with a side gap are each able to be less likely to be damaged or destroyed even when the multilayer ceramic electronic component is bent in a direction perpendicular or substantially perpendicular to the first major surface and the second major surface and thus deflected in that direction.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4A to 4C are diagrams showing a method for manufacturing a multilayer ceramic electronic component according to a preferred embodiment of the present invention.

FIG. 8A is a perspective view on the side of a first major surface of a first green chip.

FIG. 8B is a perspective view on the side of a second major surface of the first green chip.

FIG. 8C is a perspective view on the side of a first major surface of a second green chip.

FIG. 8D is a perspective view on the side of a second major surface of the second green chip.

FIG. 9A is a side view on the side of a first side surface of the first green chip and the side of the first side surface of the second green chip.

FIG. 9B is a side view on the side of a second side surface of the first green chip and the side of a second side surface of the second green chip.

FIGS. 13A to 13C are diagrams showing a method for manufacturing a multilayer ceramic electronic component according to a preferred embodiment of the present invention.

DETAILED DESCRIPTION OF THE PREFERRED EMBODIMENTS

A multilayer ceramic capacitor as an example of a multilayer ceramic electronic component according to a preferred embodiment of the present invention will be described.

Specifically, a multilayer ceramic capacitor 10 according to the present preferred embodiment is a thin multilayer ceramic capacitor 10 having a dimension T smaller than a dimension W, as shown in FIGS. 1 to 3B.

Figure 1:
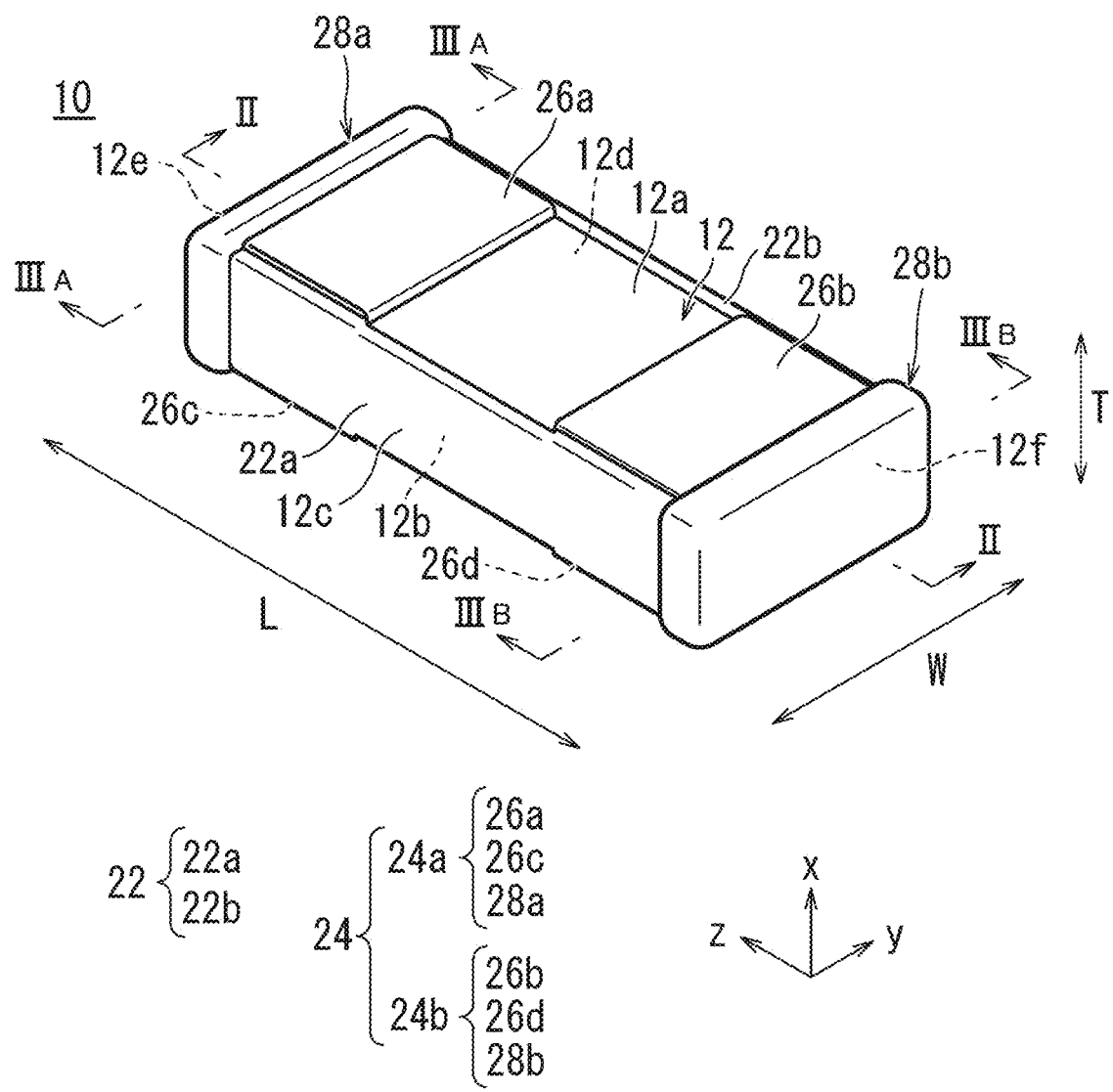
FIG. 1 is an external perspective view showing an example of a multilayer ceramic capacitor according to a preferred embodiment of the present invention.
Figure 2:
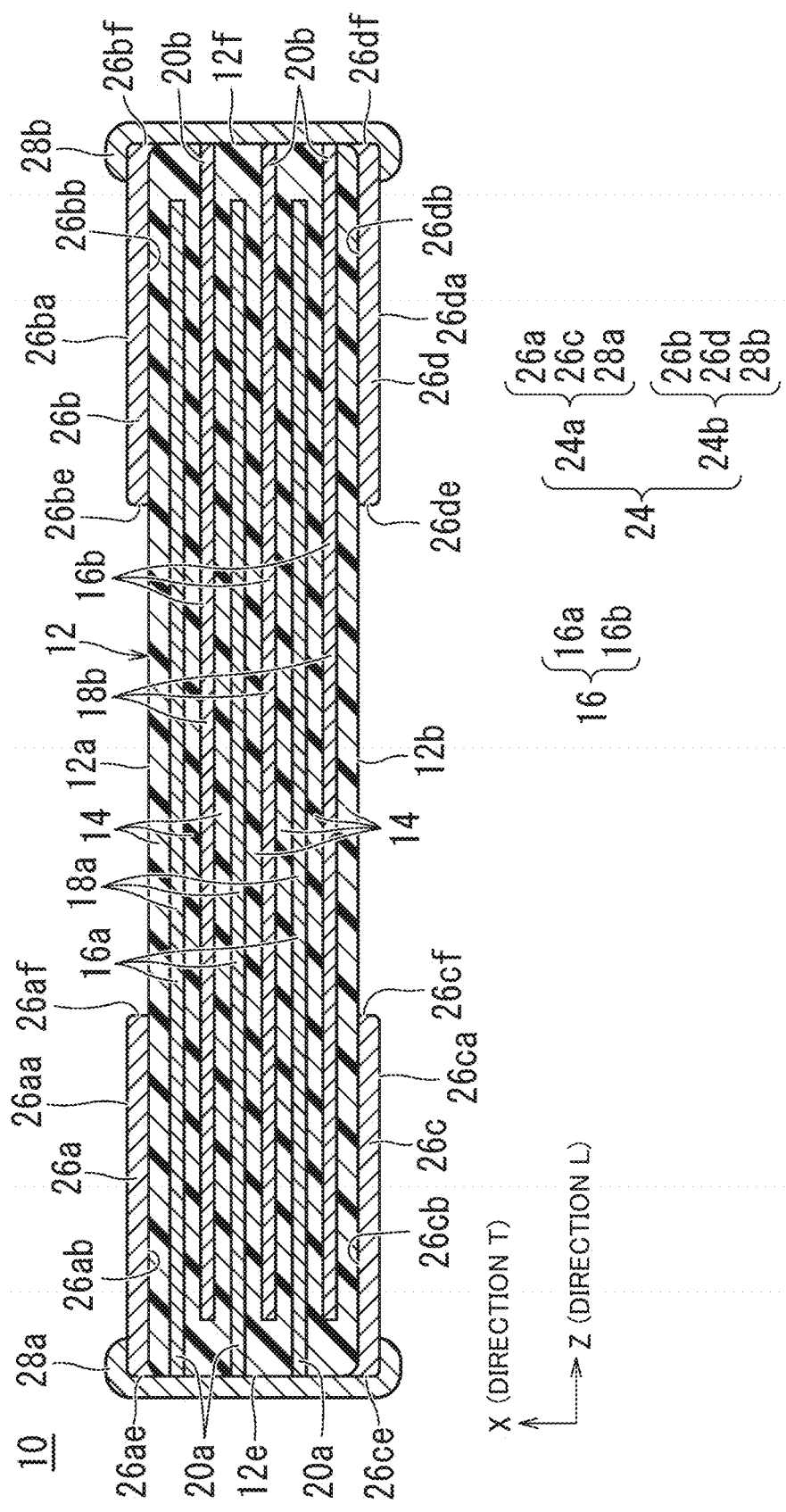
FIG. 2 is a cross section taken along a line II-II of FIG. 1 showing the multilayer ceramic capacitor.
Figure 3A:
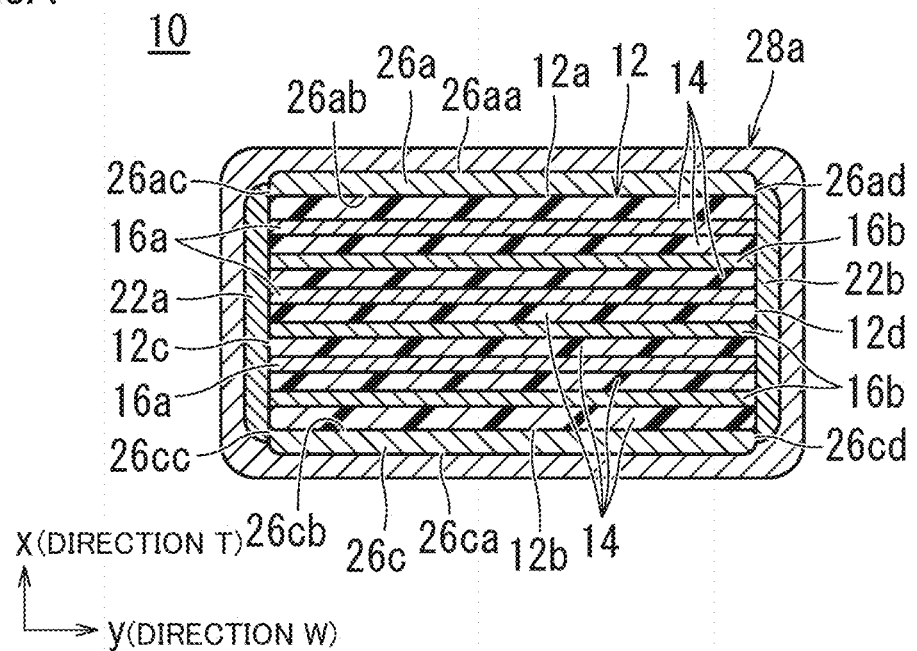
FIG. 3A is a cross section taken along a line IIIA-IIIA of FIG. 1 showing the multilayer ceramic capacitor.
Figure 3B:
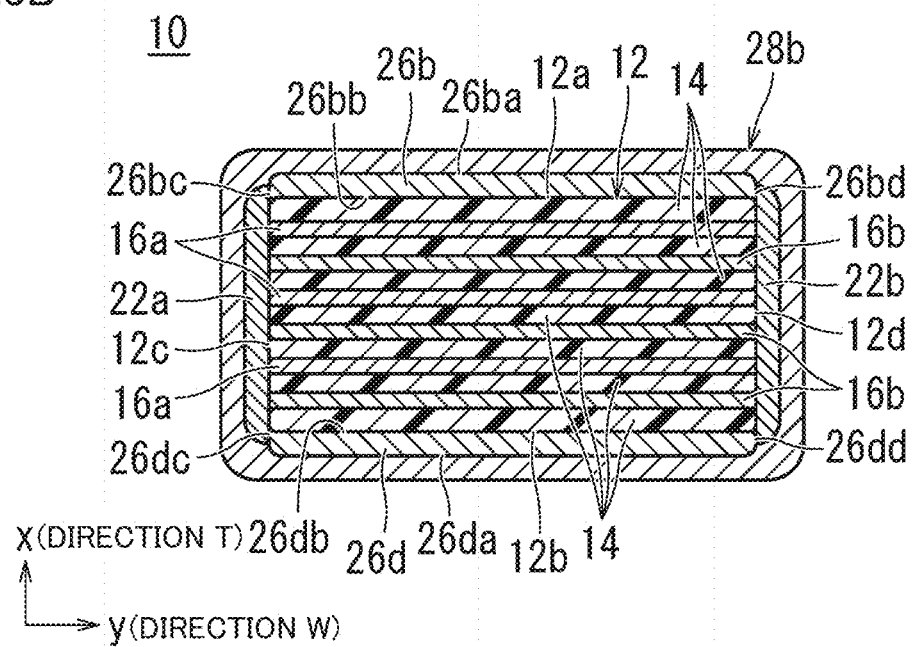
FIG. 3B is a cross section taken along a line IIIB-IIIB of FIG. 1 showing the multilayer ceramic capacitor.

Multilayer ceramic capacitor 10 manufactured in a method for manufacturing multilayer ceramic capacitor 10 according to the present preferred embodiment of the present invention will be described. FIG. 1 is an external perspective view showing an example of multilayer ceramic capacitor 10. FIG. 2 is a cross section taken along line II-II of FIG. 1 showing multilayer ceramic capacitor 10. FIG. 3A is a cross section taken along line IIIA-IIIA of FIG. 1 showing multilayer ceramic capacitor 10, and FIG. 3B is a cross section taken along line IIIB-IIIB of FIG. 1 showing multilayer ceramic capacitor 10.

As shown in FIGS. 1 to 3B, multilayer ceramic capacitor 10 includes multilayer body 12 having a rectangular parallelepiped or substantially rectangular parallelepiped shape.

As shown in FIG. 1, for multilayer body 12, a direction x is a layer stacking direction (a direction T), a direction y is a widthwise direction (a direction W), and a direction z is a lengthwise direction (a direction L). As shown in FIGS. 2, 3A and 3B, multilayer body 12 includes a plurality of stacked ceramic layers 14 and a plurality of stacked internal electrode layers 16, and includes a first major surface 12a and a second major surface 12b opposite to each other in the layer stacking direction (or direction T), a first side surface 12c and a second side surface 12d opposite to each other in the widthwise direction (or direction W), and a first end surface 12e and a second end surface 12f opposite to each other in the lengthwise direction (or direction L).

A dimension in widthwise direction y is a dimension W, a dimension in layer stacking direction x is a dimension T, and a dimension in lengthwise direction z is a dimension L.

Multilayer body 12 is preferably a rectangular parallelepiped or substantially rectangular parallelepiped and includes corners and ridges that are rounded, for example. A corner is a portion where multilayer body 12 has three surfaces meeting one another, and a ridge is a portion where multilayer body 12 has two surfaces meeting each another. The major surfaces (12a, 12b), the side surfaces (12c, 12d), and the end surfaces (12e, 12f) may be partially or entirely provided with irregularities.

As shown in FIGS. 2, 3A, and 3B, multilayer body 12 includes the plurality of internal electrode layers 16 facing one another in layer stacking direction x (or direction T), and ceramic layer 14 formed between internal electrode layers 16.

Ceramic layer 14 can be made, for example, of a dielectric material. The dielectric material may preferable be, for example, a dielectric ceramic material including $BaTiO_3$, $CaTiO_3$, $SrTiO_3$, $CaZrO_3$ or the like as a main component. When the dielectric material described above is included as a main component, a subcomponent, for example, a Mn compound, a Fe compound, a Cr compound, a Co compound, or a Ni compound, may be added thereto in a content smaller than that of the main component, depending on desired characteristics of ceramic body 12.

As shown in FIGS. 2, 3A, and 3B, the plurality of stacked internal electrode layers 16 include a plurality of first internal electrode layers 16a and a plurality of second internal electrode layers 16b.

As shown in FIGS. 2, 3A, and 3B, first internal electrode layer 16a includes a first opposite electrode portion 18a opposite to second internal electrode layer 16b, and a first lead electrode portion 20a located on the side of one end of first internal electrode layer 16a and extending from first opposite electrode portion 18a to first end surface 12e of multilayer body 12. First lead electrode portion 20a has an end thereof led to first end surface 12e and thus exposed.

As shown in FIGS. 2, 3A, and 3B, second internal electrode layer 16b includes a second opposite electrode portion 18b opposite to first internal electrode layer 16a, and a second lead electrode portion 20b located on the side of one end of second internal electrode layer 16b and extending from second opposite electrode portion 18b to second end surface 12f of multilayer body 12. Second lead electrode portion 20b has an end thereof led to second end surface 12f and thus exposed.

First internal electrode layer 16a and second internal electrode layer 16b may preferably be made of an appropriate conductive material, for example, a metal such as Ni, Cu, Ag, Pd or Au, or an alloy including at least one of these metals, such as an Ag—Pd alloy.

Multilayer ceramic capacitor 10 according to the present preferred embodiment includes first internal electrode layer 16a and second internal electrode layer 16b opposite to each other with ceramic layer 14 interposed between the first internal electrode layer 16a and the second internal electrode layer 16b to provide characteristics as a capacitor.

As shown in FIGS. 1 and 2, external electrode 24 includes a first external electrode 24a and a second external electrode 24b.

First external electrode 24a includes a first major surface electrode 26a, a third major surface electrode 26c, and a first end surface electrode 28a.

Second external electrode 24b includes a second major surface electrode 26b, a fourth major surface electrode 26d, and a second end surface electrode 28b.

For first major surface electrode 26a, second major surface electrode 26b, third major surface electrode 26c, and fourth major surface electrode 26d, direction x is a vertical direction (or direction T), direction y is a widthwise direction (or direction W), and direction z is a lengthwise direction (or direction L).

Figure 7:
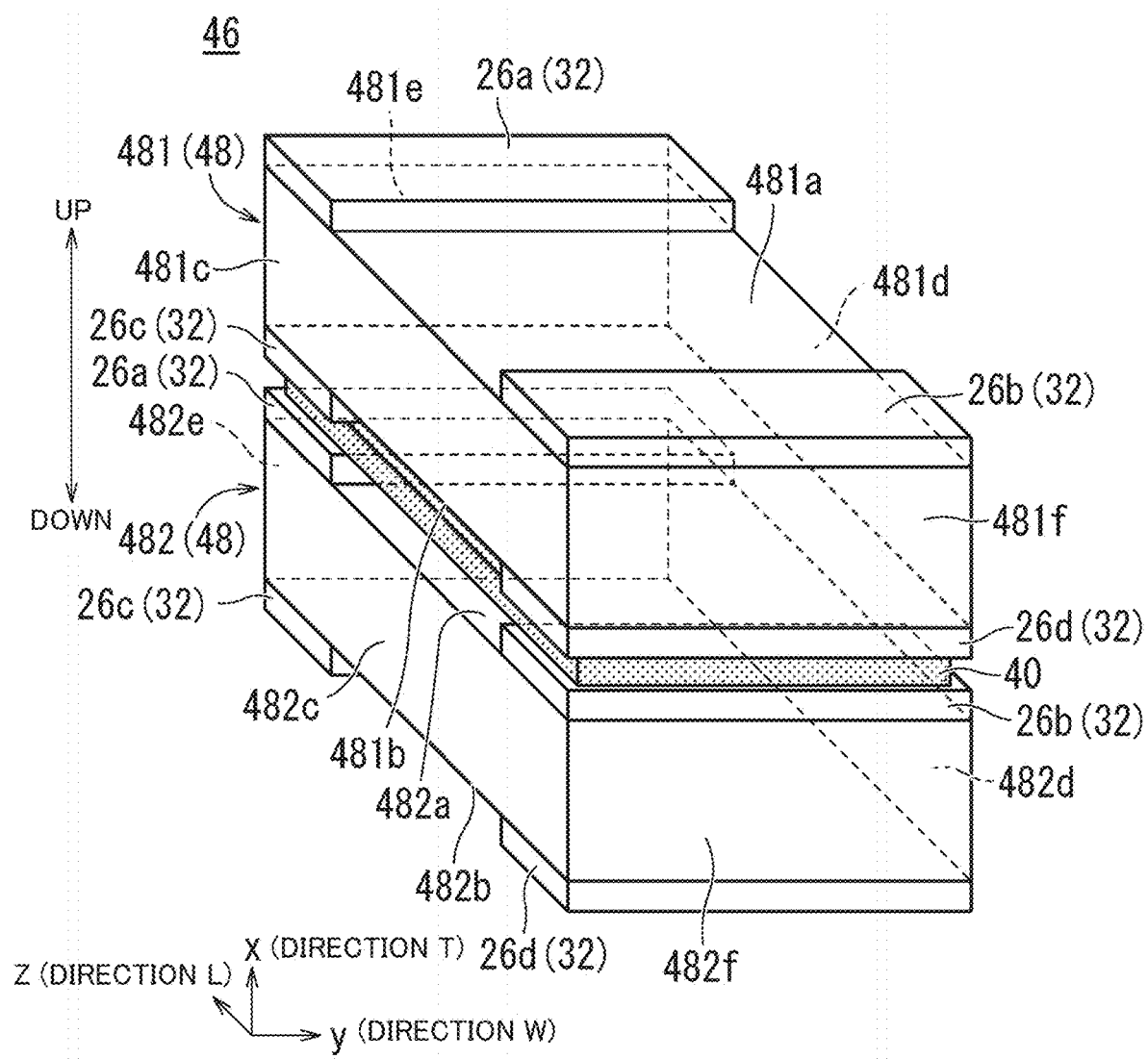
FIG. 7 is a perspective view of a fourth chip.

As shown in FIGS. 1, 2, and 3A, first major surface electrode 26a has a rectangular or substantially rectangular parallelepiped shape, and as shown in FIGS. 7, 8A, and 8C, includes a first major surface 26aa and a second major surface 26ab opposite to each other in layer stacking direction x (or direction T), a first side surface 26ac and a second side surface 26ad opposite to each other in widthwise direction y (or direction W), and a first end surface 26ae and a second end surface 26af opposite to each other in lengthwise direction z (or direction L).

As shown in FIGS. 7, 8A, and 8C, first major surface electrode 26a is located on first major surface 12a on the side of first end surface 12e, and the first major surface electrode has second major surface 26ab engaged with first major surface 12a.

As shown in FIGS. 1, 2, and 3B, second major surface electrode 26b has a rectangular or substantially a rectangular parallelepiped shape, and as shown in FIGS. 7, 8A, and 8C, includes a first major surface 26ba and a second major surface 26bb opposite to each other in layer stacking direction x (or direction T), a first side surface 26bc and a second side surface 26bd opposite to each other in widthwise direction y (or direction W), and a first end surface 26be and a second end surface 26bf opposite to each other in lengthwise direction z (or direction L).

As shown in FIGS. 7, 8A, and 8C, second major surface electrode 26b is located on first major surface 12a on the side of second end surface 12f, and the second major surface electrode has second major surface 26bb engaged with first major surface 12a.

Third major surface electrode 26c has a rectangular or substantially a rectangular parallelepiped shape, as shown in FIGS. 1, 2, and 3A, and includes, as shown in FIGS. 7, 8B, and 8D, a first major surface 26ca and a second major surface 26cb opposite to each other in layer stacking direction x (or direction T), a first side surface 26cc and a second side surface 26cd opposite to each other in widthwise direction y (or direction W), and a first end surface 26ce and a second end surface 26cf opposite to each other in lengthwise direction z (or direction L).

As shown in FIGS. 7, 8B, and 8D, third major surface electrode 26c is located on second major surface 12b on the side of first end surface 12e, and third major surface electrode 26c has second major surface 26cb engaged with second major surface 12b.

As shown in FIGS. 1, 2 and 3B, fourth major surface electrode 26d has a rectangular or substantially a rectangular parallelepiped shape, and as shown in FIGS. 7, 8B and 8D, fourth major surface electrode 26d includes a first major surface 26da and a second major surface 26db opposite to each other in layer stacking direction x (or direction T), a first side surface 26dc and a second side surface 26dd opposite to each other in widthwise direction y (or direction W), and a first end surface 26de and a second end surface 26df opposite to each other in lengthwise direction z (or direction L).

As shown in FIGS. 7, 8B, and 8D, fourth major surface electrode 26d is located on second major surface 12b on the side of second end surface 12f, and the fourth major surface electrode has second major surface 26db engaged with second major surface 12b.

As shown in FIGS. 1, 2, and 3A, first end surface electrode 28a is located outside first end surface 12e, and electrically connected to first major surface electrode 26a, third major surface electrode 26c, and first lead electrode portion 20a.

First end surface electrode 28a is electrically connected to first lead electrode portion 20a and thus to first internal electrode layer 16a.

As shown in FIGS. 1, 2, and 3B, second end surface electrode 28b is located outside second end surface 12f, and electrically connected to second major surface electrode 26b, fourth major surface electrode 26d, and second lead electrode portion 20b.

Second external electrode 24b is electrically connected to second lead electrode portion 20b and thus to second internal electrode layer 16b.

A side gap 22 includes a first side gap 22a and a second side gap 22b.

As shown in FIGS. 1, 3A, and 3B, first side gap 22a is located on the side of first side surface 12c and covers at least a portion of first side surface 12c, first side surface 26ac of the first major surface electrode, first side surface 26bc of the second major surface electrode, first side surface 26cc of the third major surface electrode, and first side surface 26dc of the fourth major surface electrode.

Note that first side gap 22a may entirely or substantially entirely cover first side surface 12c, first side surface 26ac of the first major surface electrode, first side surface 26bc of the second major surface electrode, first side surface 26cc of the third major surface electrode, and first side surface 26dc of the fourth major surface electrode.

As shown in FIGS. 1, 3A, and 3B, second side gap 22b is located on the side of second side surface 12d and covers at least a portion of second side surface 12d, second side surface 26ad of the first major surface electrode, second side surface 26bd of the second major surface electrode, second side surface 26cd of the third major surface electrode, and second side surface 26dd of the fourth major surface electrode.

Note that second side gap 22b may entirely or substantially entirely cover second side surface 12d, second side surface 26ad of the first major surface electrode, second side surface 26bd of the second major surface electrode, second side surface 26cd of the third major surface electrode, and second side surface 26dd of the fourth major surface electrode.

As shown in FIG. 1, a dimension in lengthwise direction z of multilayer ceramic capacitor 10 including multilayer body 12, first external electrode 24a, and second external electrode 24b is a dimension L, a dimension in layer stacking direction x of multilayer ceramic capacitor 10 including multilayer body 12, first external electrode 24a, and second external electrode 24b is a dimension T, and a dimension in widthwise direction y of multilayer ceramic capacitor 10 including multilayer body 12, first external electrode 24a, and second external electrode 24b is a dimension W for the sake of illustration.

Multilayer ceramic capacitor 10 preferably has dimensions as follows: in lengthwise direction z a dimension L of not less than about 0.08 mm and not more than about 1.2 mm, in layer stacking direction x a dimension T of not less than about 0.05 mm and not more than about 0.22 mm, and in widthwise direction y a dimension W of not less than about 0.3 mm and not more than about 0.7 mm, for example. Accordingly, first side gap 22a and second side gap 22b in widthwise direction y preferably has a size of about 17 μm, for example.

As will be described hereinafter, dimension T may be smaller when a side gap post-provision technique is implemented and three or more stages are applied.

Multilayer ceramic capacitor 10 shown in FIG. 1 is configured to include first side gap 22a on the side of first side surface 12c at least partially in contact with the external surface of first side surface 12c, and second side gap 22b on the side of second side surface 12d at least partially in contact with the external surface of second side surface 12d, and first external electrode 24a and second external electrode 24b cover first side gap 22a and second side gap 22b of first side surface 12c and second side surface 12d adjacent to or in a vicinity thereof, and multilayer ceramic capacitor 10 thus includes first side surface 12c reinforced by first side gap 22a and second side surface 12d reinforced by second side gap 22b. Accordingly, even when multilayer ceramic capacitor 10 is bent in a direction perpendicular or substantially perpendicular to first major surface 12a and second major surface 12b and thus deflected in that direction multilayer ceramic capacitor 10 is able to be less likely to be damaged or destroyed.

Hereinafter, a method for manufacturing the multilayer ceramic electronic component according to the present preferred embodiment will be described. Herein, a method for manufacturing multilayer ceramic capacitor 10 as an example of the multilayer ceramic electronic component will be described.

A method for manufacturing the multilayer ceramic electronic component is implemented in a process comprising printing and stacking layers, provisional pressing, forming a major surface electrode, firing the major surface electrode and a green chip, wet F barreling, forming an end surface electrode, Ni/Sn plating, pre-measurement reject screening, measurement, and appearance screening to manufacture multilayer ceramic capacitor 10. Hereinafter, this will be described more specifically.

Initially, a mother block 36 is formed as follows: as shown in FIG. 4C, for a first major surface 36a of the mother block and a second major surface 36b of the mother block, a first green sheet 30a shown in FIG. 4A is provided, and between first green sheets 30 positioned at first major surface 36a of the mother block and second major surface 36b of the mother block, second green sheets 30b shown in FIG. 4B are deposited one on another and offset. Accordingly, internal electrode layers 16 are provided at first end surface 36e of the mother block and second end surface 36f of the mother block alternately.

Subsequently, mother block 36 of stacked layers is provisionally pressed and a sandblasting sheet is used to provide handleability to mother blocks 36.

Subsequently, an external electrode is formed.

The external electrode is formed through the steps of forming a major surface electrode, main pressing, cutting, a side gap post-provision technique, dissolution, wet G barreling, and applying an end electrode.

Figure 5A:
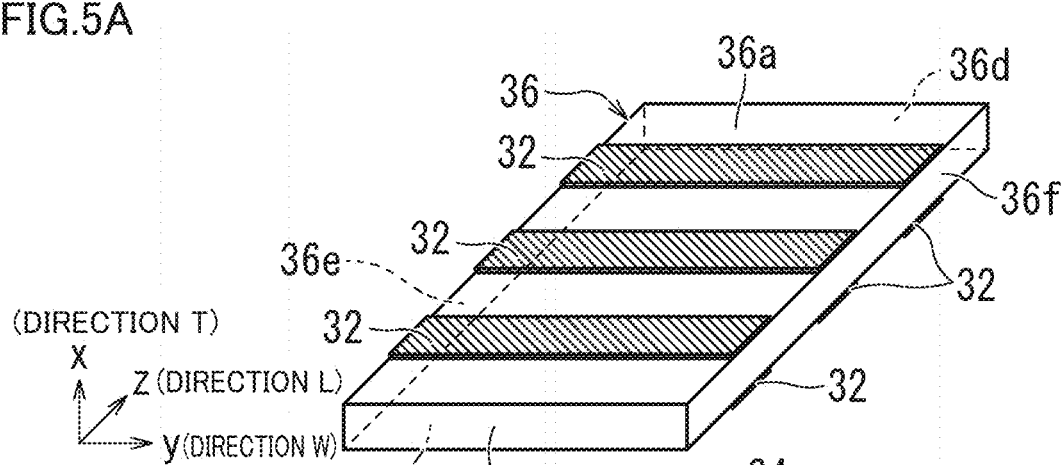
FIGS. 5A to 5C are diagrams showing a method for manufacturing a multilayer ceramic electronic component according to a preferred embodiment of the present invention.

Initially, as shown in FIG. 5A, screen printing is applied to print a thin film of conductive paste on first major surface 36a and second major surface 36b of the provisionally pressed mother block 36 to form an external electrode pattern 32 on first major surface 36a of the mother block and second major surface 36b of the mother block.

Note that external electrode pattern 32 is thus formed for the following reason: as shown in FIGS. 5A to 6C, mother block 36 is formed and after that when mother block 36 is cut or the like to form a green chip 48, first major surface electrode 26a and second major surface electrode 26b formed on first major surface 48a of the green chip and third major surface electrode 26c and fourth major surface electrode 26d formed on second major surface 48b of the green chip are flat and have sufficient area to facilitate connection, for example, a via for embedding in a substrate.

Figure 5B:
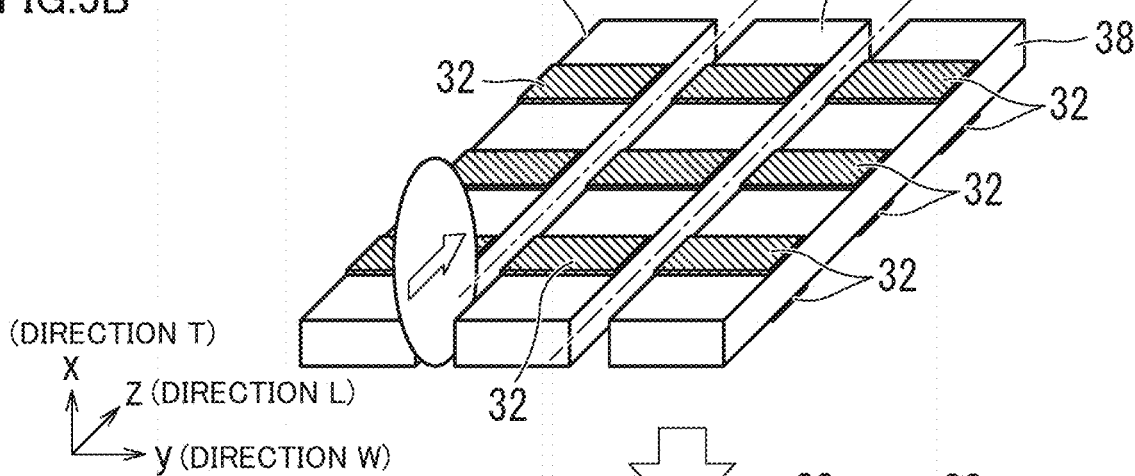
Figure 5C:
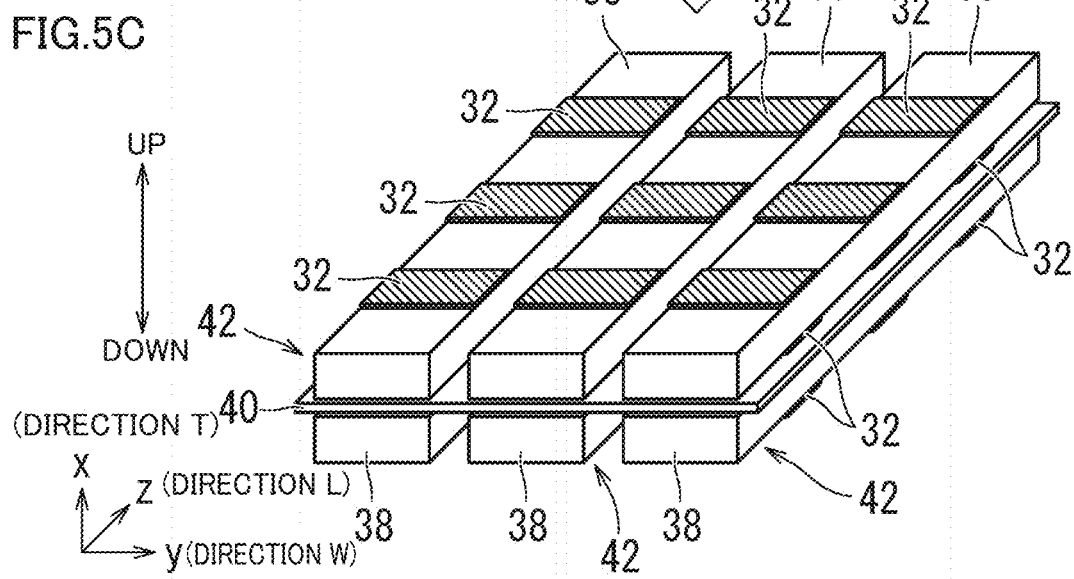
Figure 6A:
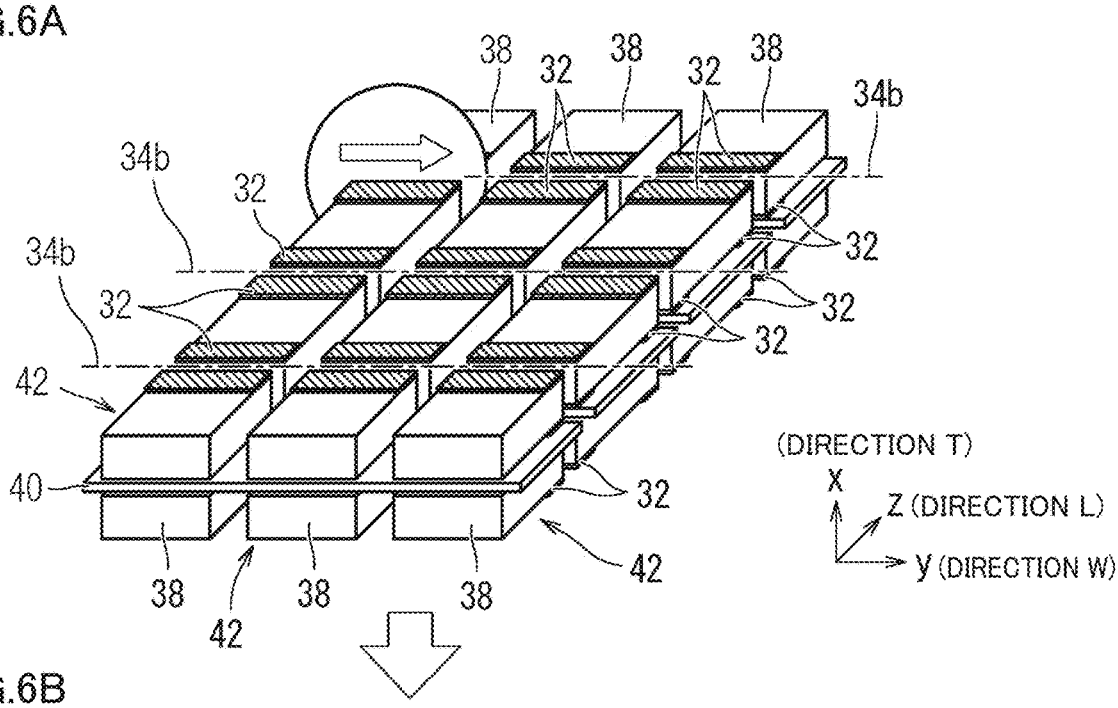
FIGS. 6A to 6C are diagrams showing a method for manufacturing a multilayer ceramic electronic component according to a preferred embodiment of the present invention.
Figure 6B:
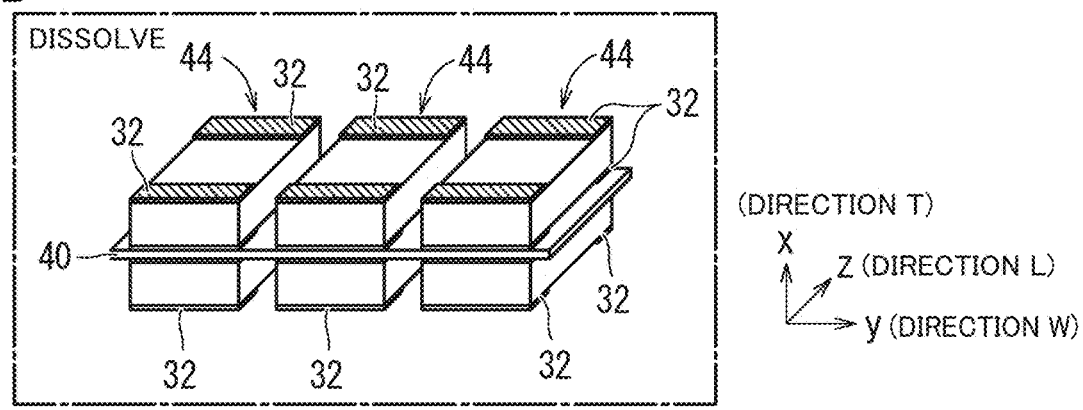
Figure 6C:
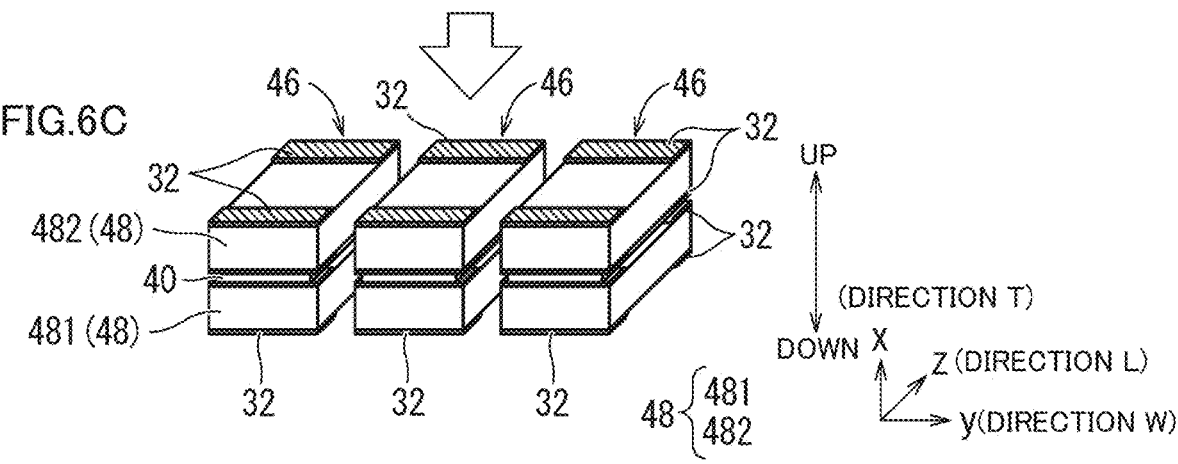

Subsequently, as shown in FIGS. 5A to 6C, after mother block 36 is formed, mother block 36 is cut or the like to form fourth chip 46 shown in FIGS. 6C and 7.

Mother block 36 is formed and after that when mother block 36 is cut or the like to form fourth chip 46, external electrode pattern 32 screen-printed on first major surface 36a of the mother block forms first major surface electrode 26a formed on first major surface 48a of a green chip of each of a plurality of fourth chips 46 on the side of a first end surface 48e of the green chip, and second major surface electrode 26b formed on first major surface 48a of the green chip on the side of a second end surface 48f of the green chip.

Furthermore, mother block 36 is formed and after that when mother block 36 is cut or the like to form fourth chip 46, external electrode pattern 32 screen-printed on second major surface 36b of the mother block forms third major surface electrode 26c formed on second major surface 48b of a green chip of each of the plurality of fourth chips 46 on the side of first end surface 48e of the green chip, and fourth major surface electrode 26d formed on second major surface 48b of the green chip on the side of second end surface 48f of the green chip.

In the method for manufacturing thin multilayer ceramic capacitor 10 having a small dimension T relative to dimension W, as shown in FIGS. 1 to 3B, according to the present preferred embodiment of the present invention, after thin multilayer ceramic capacitor 10 having a small dimension T relative to dimension W is completed, first side gap 22a is formed on first side surface 48c of green chip 48 forming multilayer body 12, and second side gap 22b is formed on second side surface 48d of the green chip, in a method as will be described hereinafter.

For a method for forming a side gap on a side surface of a green chip, initially, a method for manufacturing green chip 48 will be described, and then, a method for providing first side gap 22a on first side surface 48c of green chip 48 and second side gap 22b on second side surface 48d of the green chip, that is, a side gap post-provision technique, will be described.

A method for manufacturing a green chip will be described.

In FIGS. 6A to 7, a positive direction along the x-axis (or in direction T) will be referred to as up or an upward direction, and a negative direction along the x-axis (or in direction T) will be referred to as down or a downward direction.

Initially, after multilayer ceramic capacitor 10 is completed, a green sheet 30 for forming multilayer body 12 is prepared.

Green sheet 30 includes a first green sheet 30a on which a conductive paste is not printed, as shown in FIG. 4A, and a second green sheet 30b on which the conductive paste is printed to form an internal electrode pattern 33, as shown in FIG. 4B.

Subsequently, mother block 36 is formed.

As shown in FIG. 5A, mother block 36 includes a first major surface 36a and a second major surface 36b opposite to each other in direction x (or direction T), a first side surface 36c and a second side surface 36d opposite to each other in direction y (or direction W), and a first end surface 36e and a second end surface 36f opposite to each other in direction z (or direction L). As shown in FIG. 5A, for mother block 36, direction x (or direction T) is a layer stacking direction, direction y (or direction W) is a widthwise direction, and direction z (or direction L) is a lengthwise direction.

As shown in FIG. 4C, in mother block 36, first green sheet 30a is provided for first major surface 36a of the mother block and second major surface 36b of the mother block.

As shown in FIGS. 2, 3A, and 3B, after multilayer ceramic capacitor 10 is completed, first and second lead electrode portions 20a and 20b are alternately provided at first and second end surfaces 12e and 12f of multilayer body 12. As shown in FIG. 4C, second green sheets 30b are stacked and offset between first green sheets 30a located at first major surface 36a of the mother block and second major surface 36b of the mother block.

As shown in FIG. 4C, after second green sheets 30b are stacked and offset between first green sheets 30a located at first major surface 36a of the mother block and second major surface 36b of the mother block, first green sheets 30a and second green sheets 30b are hydraulically pressed or the like in a direction in which mother block 36 has its layers stacked, or direction x (or direction T), to form mother block 36.

After mother block 36 is formed, then, as shown in FIG. 5A, external electrode pattern 32 is printed on first green sheets 30a located at first major surface 36a of the mother block and second major surface 36b of the mother block.

Thereafter, as shown in FIG. 5B, mother block 36 is cut along a cutting line 34a in direction L, which is a cutting line in direction z (or direction L), to form a first chip 38.

Subsequently, as shown in FIG. 5C, an adhesive film 40 as a binder is placed on one first chip 38 and another first chip 38 is placed on adhesive film 40 to form a second chip 42.

Adhesive film 40 as the binder may be a water-soluble film. The water-soluble film may preferably be made, for example, of polyvinyl alcohol.

Furthermore, subsequently, as shown in FIG. 6A, second chip 42 is cut along a cutting line 34b in direction W, which is a cutting line in direction y (or direction W), to form a third chip 44.

Furthermore, subsequently, as shown in FIG. 6B, adhesive film 40 protruding outside third chip 44 is immersed in water together with third chip 44 and thus dissolved to individualize third chip 44 as shown in FIG. 6C. In doing so, adhesive film 40 dissolved into small pieces (or burr) may ultrasonically be washed away.

As shown in FIG. 6C, when third chip 44 is individualized, fourth chip 46 is formed. As shown in FIGS. 6C and 7, fourth chip 46 includes two green chips 48. Of the two green chips 48 defining fourth chip 46, in FIGS. 6C and 7, green chip 48 located downward in direction x (or direction T) will be referred to as a first green chip 481, and green chip 48 located on first green chip 481 in direction x (or direction T) will be referred to as a second green chip 482.

As shown in FIG. 7, first green chip 481 includes a first major surface 481a and a second major surface 481b opposite to each other in direction x (or direction T), a first side surface 481c and a second side surface 481d opposite to each other in direction y (or direction W), and a first end surface 481e and a second end surface 481f opposite to each other in direction z (or direction L).

In the first green chip 481, first side surface 481c, second side surface 481d, first end surface 481e and second end surface 481f will collectively be referred to as a lateral periphery 481g of first green chip 481.

As shown in FIGS. 7 and 8A, external electrode pattern 32 located on first major surface 481a of the first green chip on the side of first end surface 481e of the first green chip defines first major surface electrode 26a.

As shown in FIGS. 7 and 8A, external electrode pattern 32 located on first major surface 481a of the first green chip on the side of second end surface 481f of the first green chip defines second major surface electrode 26b.

As shown in FIGS. 7 and 8B, external electrode pattern 32 located on second major surface 481b of the first green chip on the side of first end surface 481e of the first green chip defines third major surface electrode 26c.

As shown in FIGS. 7 and 8B, external electrode pattern 32 located on second major surface 481b of the first green chip on the side of second end surface 481f of the first green chip defines fourth major surface electrode 26d.

As shown in FIGS. 7 and 8A, second green chip 482 includes a first major surface 482a and a second major surface 482b opposite to each other in direction x (or direction T), a first side surface 482c and a second side surface 482d opposite to each other in direction y (or direction W), and a first end surface 482e and a second end surface 482f opposite to each other in direction z (or direction L).

In the second green chip 482, first side surface 482c, second side surface 482d, first end surface 482e and second end surface 482f will collectively be referred to as a lateral periphery 482g of second green chip 482.

As shown in FIGS. 7 and 8C, external electrode pattern 32 located on first major surface 482a of the second green chip on the side of first end surface 482e of the second green chip defines first major surface electrode 26a.

As shown in FIGS. 7 and 8C, external electrode pattern 32 located on first major surface 482a of the second green chip on the side of second end surface 482f of the second green chip defines second major surface electrode 26b.

As shown in FIGS. 7 and 8D, external electrode pattern 32 located on second major surface 482b of the second green chip on the side of first end surface 482e of the second green chip defines third major surface electrode 26c.

As shown in FIGS. 7 and 8D, external electrode pattern 32 located on second major surface 482b of the second green chip on the side of second end surface 482f of the second green chip defines fourth major surface electrode 26d.

As shown in FIG. 9A, first side surface 26ac of the first major surface electrode and first side surface 26bc of the second major surface electrode located on first major surface 481a of the first green chip, and in addition, first side surface 26cc of the third major surface electrode and first side surface 26dc of the fourth major surface electrode located on second major surface 481b of the first green chip, will collectively be referred to as a first outer side surface 481h of the first green chip.

As shown in FIG. 9A, first side surface 26ac of the first major surface electrode and first side surface 26bc of the second major surface electrode located on first major surface 482a of the second green chip, and in addition, first side surface 26cc of the third major surface electrode and first side surface 26dc of the fourth major surface electrode located on second major surface 482b of the second green chip, will collectively be referred to as a first outer side surface 482h of the second green chip.

As shown in FIG. 9B, second side surface 26ad of first major surface electrode 26a and second side surface 26bd of second major surface electrode 26b located on first major surface 481a of the first green chip, and, in addition, second side surface 26cd of third major surface electrode 26c and second side surface 26dd of fourth major surface electrode 26d located on second major surface 481b of the first green chip, will collectively be referred to as a second outer side surface 481i of the first green chip.

As shown in FIG. 9B, second side surface 26ad of the first major surface electrode and second side surface 26bd of the second major surface electrode located on first major surface 482a of the second green chip, and in addition, second side surface 26cd of the third major surface electrode and second side surface 26dd of the fourth major surface electrode located on second major surface 482b of the second green chip, will collectively be referred to as a second outer side surface 482i of the second green chip.

As shown in FIG. 7, fourth chip 46 has a two-stage structure including first green chip 481 and second green chip 482, and adhesive film 40 is placed on first major surface 481a of the first green chip and second major surface 482b of the second green chip is placed on adhesive film 40. Note, however, that fourth chip 46 may include three or more stages such that adhesive film 40 is placed on first major surface 482a of the second green chip and another green chip 48 is placed on adhesive film 40.

A side gap post-provision technique which is a method for providing first side gap 22a to cover first side surface 48c of the green chip and providing second side gap 22b to cover second side surface 48d of the green chip will be described.

In FIGS. 10A to 14C, a positive direction along the x-axis (or in direction T) will be referred to as up or an upward direction, and a negative direction along the x-axis (or in direction T) will be referred to as down or a downward direction.

Figure 10A:
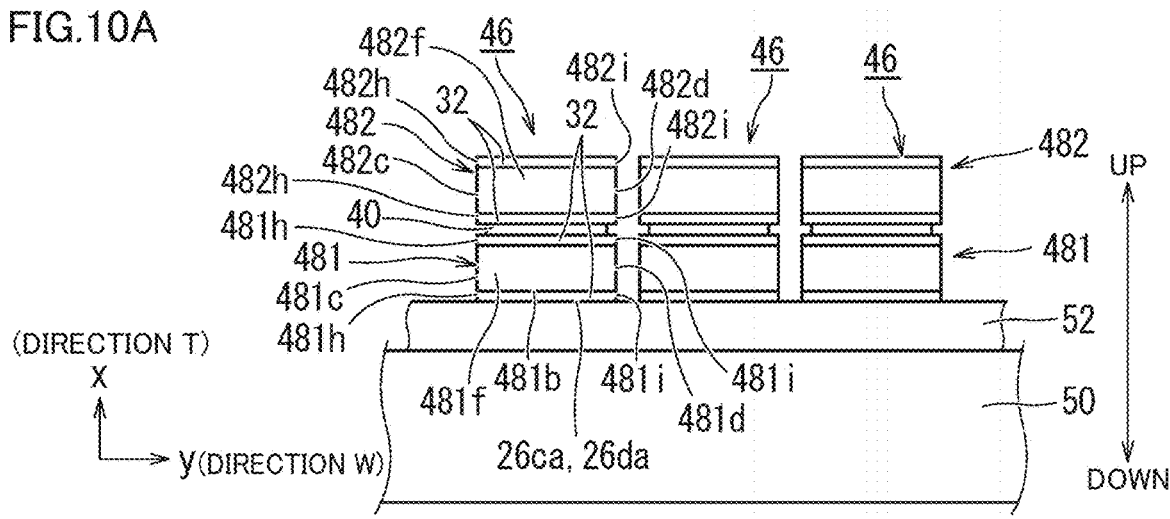
FIGS. 10A to 10C are diagrams showing a method for manufacturing a multilayer ceramic electronic component according to a preferred embodiment of the present invention.

Initially, as shown in FIG. 10A, fourth chip 46 is placed on first adhesive sheet 52 located on an expansion device 50. Accordingly, first major surface 26ca of third major surface electrode 26c and first major surface 26da of fourth major surface electrode 26d located on second major surface 481b of the first green chip located at a lower portion of each of a plurality of fourth chips 46 are engaged with first adhesive sheet 52.

Figure 10B:
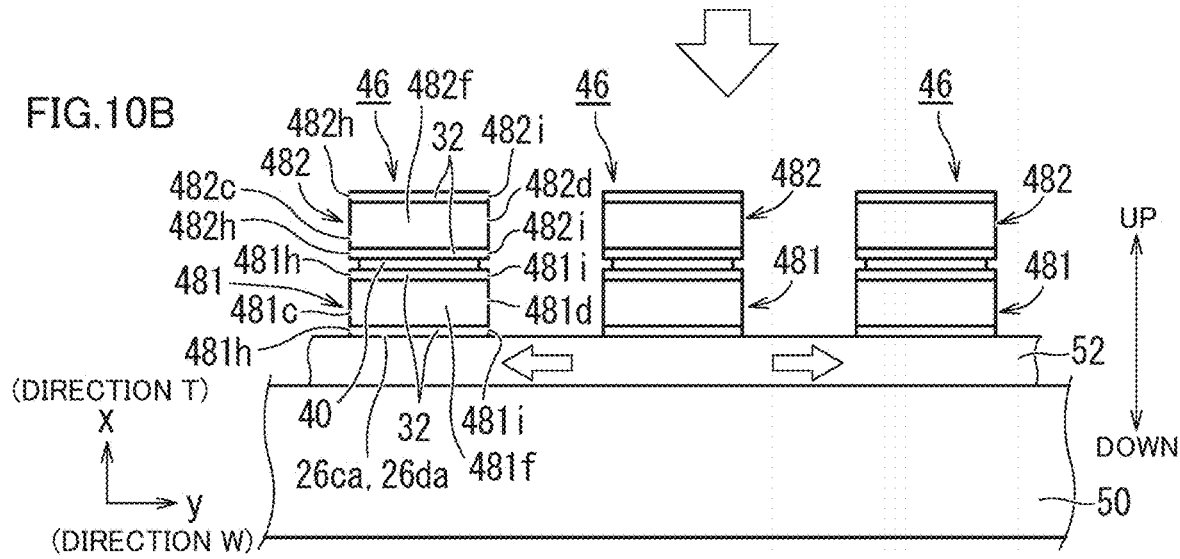
Figure 10C:
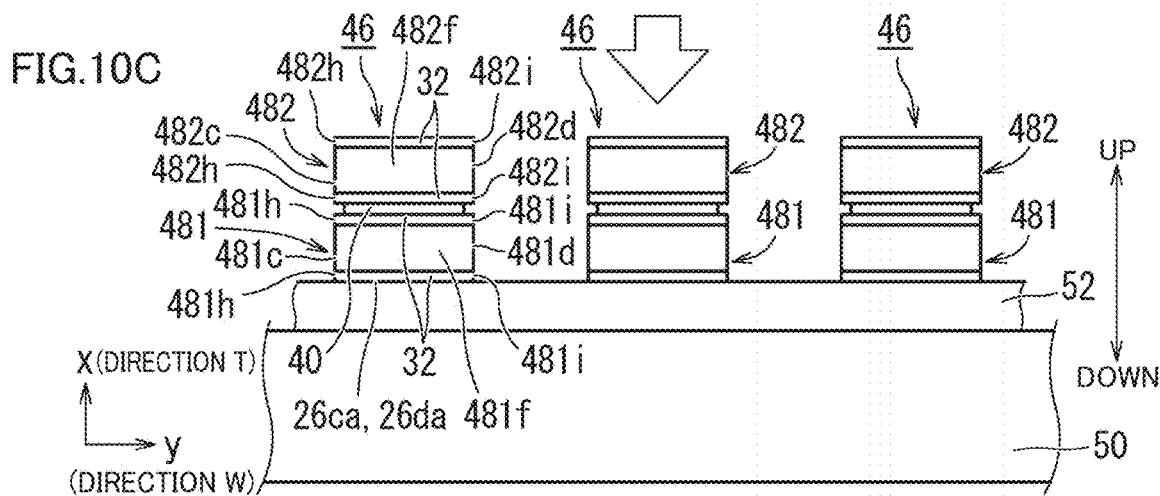

Subsequently, as shown in FIG. 10B, adhesive sheet 52 is expanded by expansion device 50 along the z-axis (or in direction L) and the y-axis (or in direction W). Thus, as shown in FIG. 10C, the plurality of fourth chips 46 provided along the z-axis (or in direction L) and the y-axis (or in direction W) are spaced apart from one another.

Thus, even when fourth chip 46 is rotated in a later step performed to rotate fourth chip 46, lateral peripheries 481g and 482g of the first and second green chips, respectively, included in one fourth chip 46 and having a binder applied thereto are less likely to come in contact with first major surface 481a of the first green chip included in another fourth chip 46, second major surface 481b of the first green chip included in the other fourth chip 46, first major surface 482a of the second green chip included in the other fourth chip 46, second major surface 482b of the second green chip included in the other fourth chip 46, lateral periphery 481g of the first green chip included in the other fourth chip 46 and having the binder applied thereto, or lateral periphery 482g of the second green chip included in the other fourth chip 46 and having the binder applied thereto, and thus even when fourth chip 46 is rotated, it is less likely to re-adhere to the other fourth chip 46.

Figure 11A:
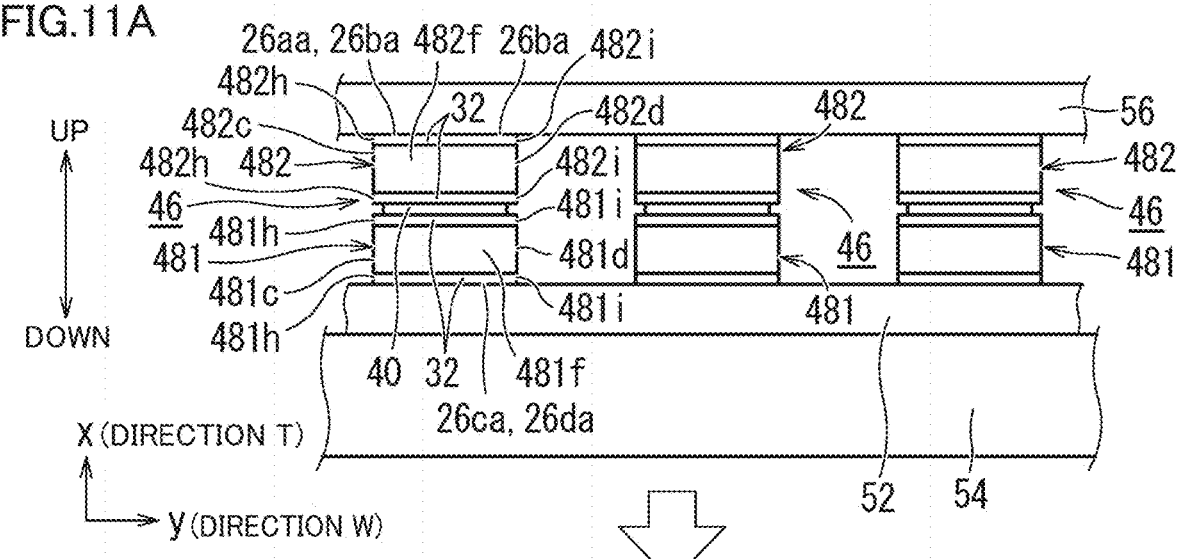
FIGS. 11A to 11C are diagrams showing a method for manufacturing a multilayer ceramic electronic component according to a preferred embodiment of the present invention.

Furthermore, subsequently, as shown in FIG. 11A, first adhesive sheet 52 on which the plurality of fourth chips 46 are placed is removed from expansion device 50 and re-placed on a plate 54, and a working plate 56 is brought from above the plurality of fourth chips 46 to approach the plurality of fourth chips 46 and thus placed on the plurality of fourth chips 46.

As a result, as shown in FIG. 11A, first adhesive sheet 52 is located on plate 54, the plurality of fourth chips 46 are located on first adhesive sheet 52, working plate 56 is located on the plurality of fourth chips 46, and first major surface 26ca of third major surface electrode 26c and first major surface 26da of fourth major surface electrode 26d located on second major surface 481b of the first green chip located at a lower surface of each of the plurality of fourth chips 46 are engaged with first adhesive sheet 52, and first major surface 26aa of first major surface electrode 26a and first major surface 26ba of second major surface electrode 26b located on first major surface 481a of the second green chip located at an upper surface of each of the plurality of fourth chips 46 are engaged with working plate 56.

Figure 11B:
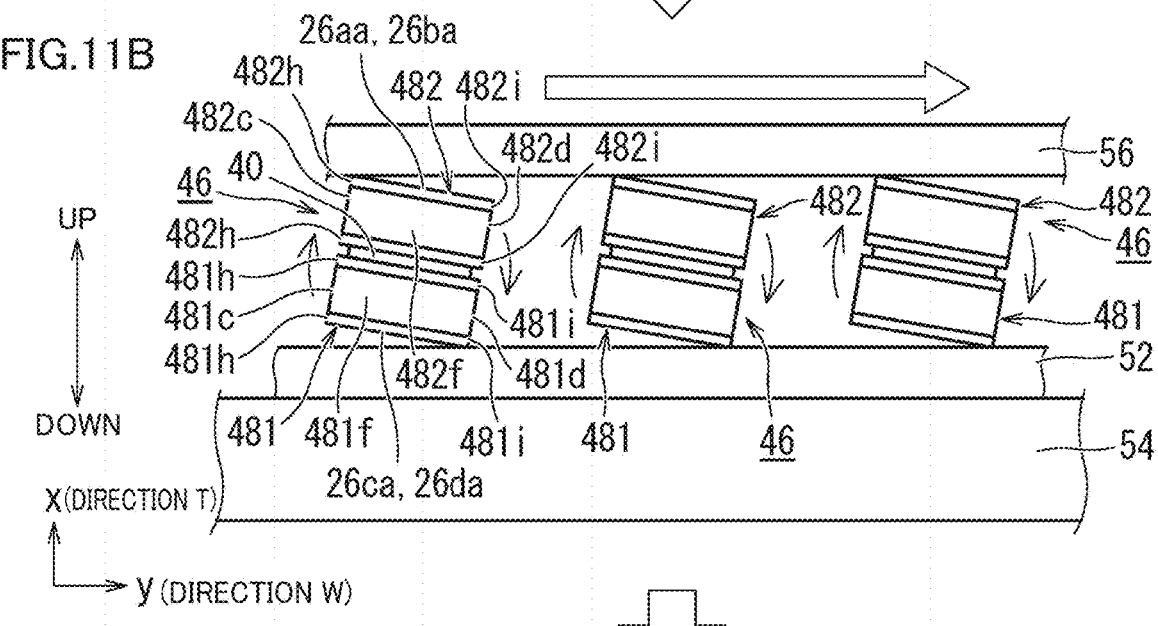
Figure 11C:
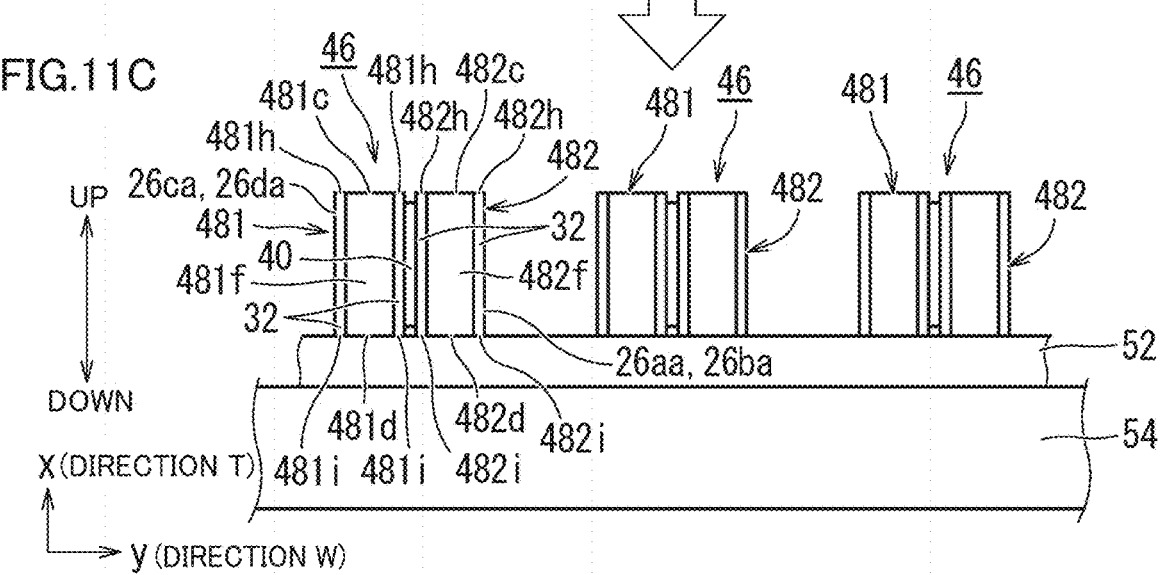

Thereafter, when working plate 56 is moved in direction y (or direction W), as shown in FIG. 11B, the plurality of fourth chips 46 mounted on first adhesive sheet 52 rotate by about 90° in direction y (or direction W), as shown in FIG. 11C.

As a result, as shown in FIG. 11C, first adhesive sheet 52 is located on plate 54, the plurality of fourth chips 46 are located on first adhesive sheet 52, second side surface 481d of the first green chip, second outer side surface 481i of the first green chip, second side surface 482d of the second green chip, and second outer side surface 482i of the second green chip located at the lower surface of each of the plurality of fourth chips 46 are engaged with first adhesive sheet 52, and at the upper surface of each of the plurality of fourth chips 46, first side surface 481c of the first green chip, first outer side surface 481h of the first green chip, first side surface 482c of the second green chip, and first outer side surface 482h of the second green chip are located.

Figure 12A:
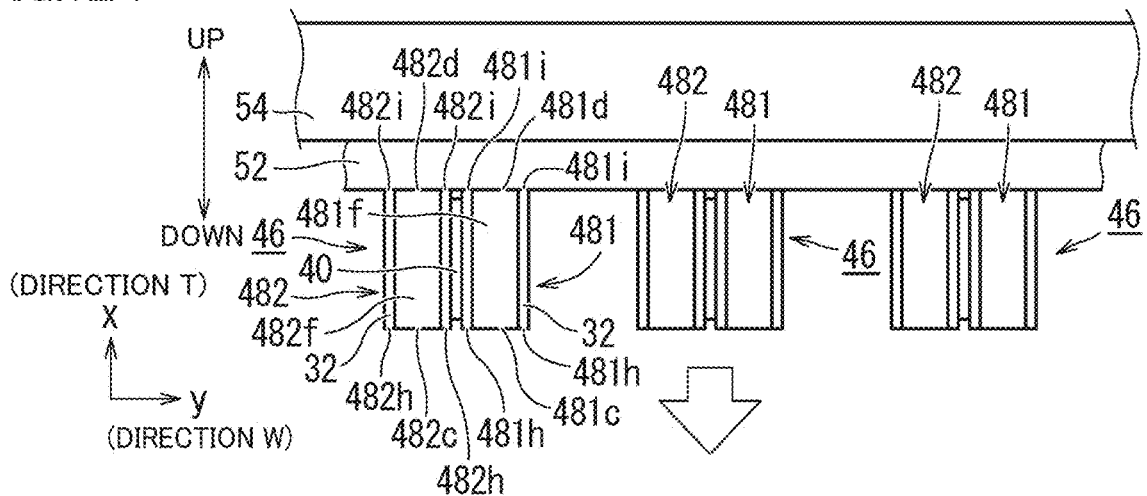
FIGS. 12A to 12C are diagrams showing a method for manufacturing a multilayer ceramic electronic component according to a preferred embodiment of the present invention.

Furthermore, thereafter, as shown in FIG. 12A, the plurality of fourth chips 46, first adhesive sheet 52, and plate 54 are rotated by about 180° in direction y (or direction W).

As a result, first adhesive sheet 52 is located on the plurality of fourth chips 46, plate 54 is located on first adhesive sheet 52, second side surface 481d of the first green chip, second outer side surface 481i of the first green chip, second side surface 482d of the second green chip, and second outer side surface 482i of the second green chip located at the upper surface of each of the plurality of fourth chips 46 are engaged with first adhesive sheet 52, and at the lower surface of each of the plurality of fourth chips 46, first side surface 481c of the first green chip, first outer side surface 481h of the first green chip, first side surface 482c of the second green chip, and first outer side surface 482h of the second green chip are located.

Thereafter, an adhesive is applied to first side surface 481c of the first green chip, first outer side surface 481h of the first green chip, first side surface 482c of the second green chip, and first outer side surface 482h of the second green chip located at the lower surface of each of the plurality of fourth chips 46.

Figure 12B:
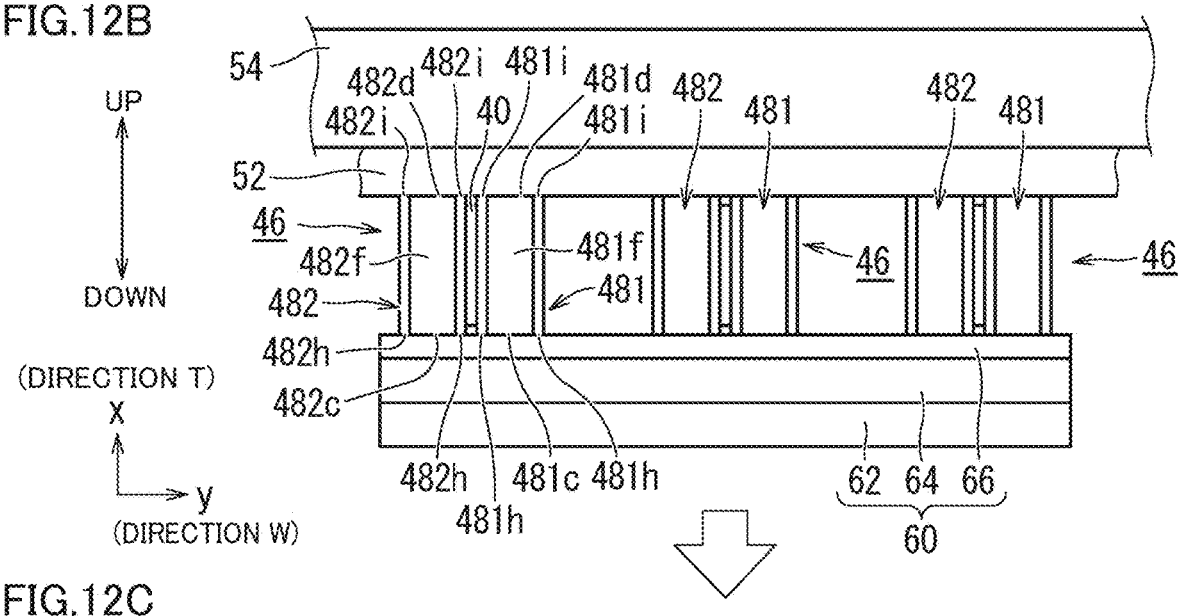

Subsequently, as shown in FIG. 12B, a first side gap forming sheet 60 formed by providing a PET resin 64 on rubber 62 in a layer and providing a side gap sheet 66 on PET resin 64 in a layer is prepared.

Subsequently, as shown in FIG. 12B, the plurality of fourth chips 46, adhesive sheet 52, and plate 54 are brought from above first side gap forming sheet 60 to approach first side gap forming sheet 60 and pressed against first side gap forming sheet 60 to press side gap sheet 66 against first side surface 481c of the first green chip, first outer side surface 481h of the first green chip, first side surface 482c of the second green chip, and first outer side surface 482h of the second green chip located at the lower surface of each of the plurality of fourth chips 46 and having the adhesive applied thereto.

Figure 12C:
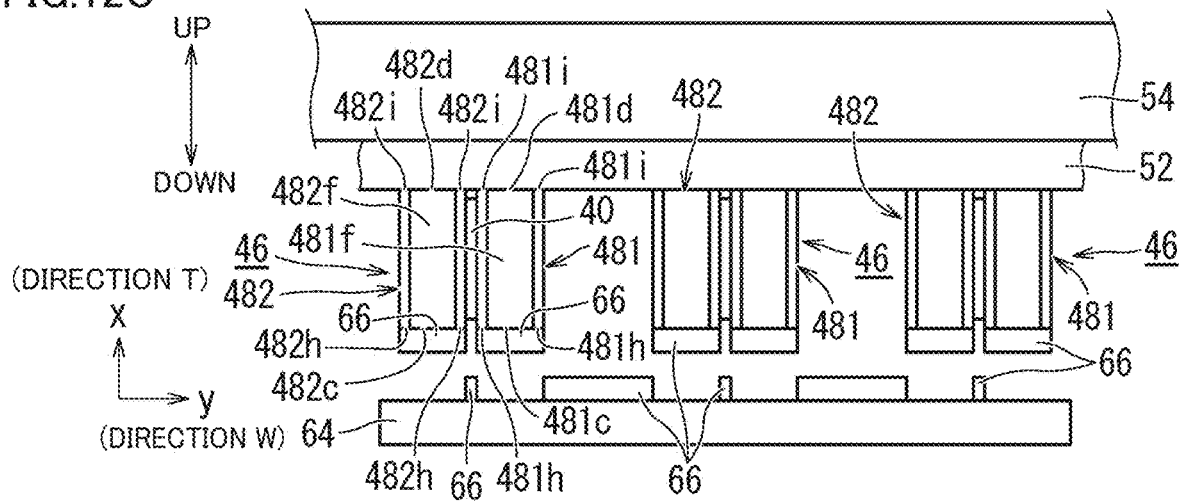

Furthermore, subsequently, as shown in FIG. 12C, the plurality of fourth chips 46, adhesive sheet 52, and plate 54 are separated from first side gap forming sheet 60.

When the plurality of fourth chips 46, adhesive sheet 52, and plate 54 are separated from first side gap forming sheet 60, then, as shown in FIG. 12C, side gap sheet 66 adheres to and thus remains on first side surface 481c of the first green chip, first outer side surface 481h of the first green chip, first side surface 482c of the second green chip, and first outer side surface 482h of the second green chip located at the lower surface of each of the plurality of fourth chips 46.

When side gap sheet 66 adhering to and thus remaining on first side surface 481c of the first green chip, first outer side surface 481h of the first green chip, first side surface 482c of the second green chip, and first outer side surface 482h of the second green chip located at the lower surface of each of the plurality of fourth chips 46 is dried, first side gap 22a covers at least a portion of first side surface 481c of the first green chip, first outer side surface 481h of the first green chip, first side surface 482c of the second green chip and first outer side surface 482h of the second green chip. Note that first side gap 22a may cover first side surface 481c, first outer side surface 481h of the first green chip, first side surface 482c of the second green chip, and first outer side surface 482h of the second green chip entirely.

Hereinafter, fourth chip 46 including first side gap 22a that covers at least a portion of first side surface 481c of the first green chip, first outer side surface 481h of the first green chip, first side surface 482c of the second green chip, and first outer side surface 482h of the second green chip will be referred to as a partially formed fourth chip 461.

Thereafter, as shown in FIG. 13A, a plurality of partially formed fourth chips 461, first adhesive sheet 52, and plate 54 are rotated by about 180° in direction y (or direction W).

As a result, first adhesive sheet 52 is located on plate 54, the plurality of partially formed fourth chips 461 are located on first adhesive sheet 52, and second side surface 481d of the first green chip, second outer side surface 481i of the first green chip, second side surface 482d of the second green chip, and second outer side surface 482i of the second green chip located at the lower surface of each of the plurality of partially formed fourth chips 461 are engaged with first adhesive sheet 52.

Subsequently, as shown in FIG. 13A, second adhesive sheet 58 is brought from above the plurality of partially formed fourth chips 461 to approach the plurality of partially formed fourth chips 461 and thus pressed against first side gap 22a of the plurality of partially formed fourth chips 461.

As a result, first adhesive sheet 52 is located on plate 54, the plurality of partially formed fourth chips 461 are located on first adhesive sheet 52, second adhesive sheet 58 is located on the plurality of partially formed fourth chips 461, first side gap 22a located at the upper portion of each of the plurality of partially formed fourth chips 461 is engaged with second adhesive sheet 58, and second side surface 481d of the first green chip, second outer side surface 481i of the first green chip, second side surface 482d of the second green chip and second outer side surface 482i of the second green chip located at the lower surface of each of the plurality of partially formed fourth chips 461 are engaged with first adhesive sheet 52.

Furthermore, subsequently, as shown in FIG. 13B, first adhesive sheet 52 and plate 54 are separated from the plurality of partially formed fourth chips 461 and second adhesive sheet 58.

As a result, second adhesive sheet 58 is located on the plurality of partially formed fourth chips 461, first side gap 22a located at the upper portion of each of the plurality of partially formed fourth chips 461 is engaged with second adhesive sheet 58, and second side surface 481d of the first green chip, second outer side surface 481i of the first green chip, second side surface 482d of the second green chip and second outer side surface 482i of the second green chip are located at the lower surface of each of the plurality of partially formed fourth chips 461.

Thereafter, as shown in FIG. 13B, the plurality of partially formed fourth chips 461 and second adhesive sheet 58 are rotated by about 180° in direction y (or direction W).

As a result, the plurality of partially formed fourth chips 461 are located on second adhesive sheet 58, first side gap 22a located at the lower portion of each of the plurality of partially formed fourth chips 461 is engaged with second adhesive sheet 58, and second side surface 481d of the first green chip, second outer side surface 481i of the first green chip, second side surface 482d of the second green chip and second outer side surface 482i of the second green chip are located at the upper surface of each of the plurality of partially formed fourth chips 461.

Subsequently, as shown in FIG. 13B, a second side gap forming sheet 68 formed by providing side gap sheet 66 under PET resin 64 is prepared.

Subsequently, an adhesive is applied to second side surface 481d of the first green chip, second outer side surface 481i of the first green chip, second side surface 482d of the second green chip, and second outer side surface 482i of the second green chip located at the upper surface of each of the plurality of partially formed fourth chips 461.

Thereafter, as shown in FIG. 13B, second side gap forming sheet 68 is brought from above the plurality of partially formed fourth chips 461 and second adhesive sheet 58 to approach the plurality of partially formed fourth chips 461 and second adhesive sheet 58 and thus pressed against the plurality of partially formed fourth chips 461 to press side gap sheet 66 against second side surface 481d of the first green chip, second outer side surface 481i of the first green chip, second side surface 482d of the second green chip and second outer side surface 482i of the second green chip located at the upper surface of each of the plurality of partially formed fourth chips 461 and having the adhesive applied thereto.

Subsequently, as shown in FIG. 13C, second side gap forming sheet 68 is separated from the plurality of partially formed fourth chips 461 and second adhesive sheet 58.

When second side gap forming sheet 68 is separated from the plurality of partially formed fourth chips 461 and second adhesive sheet 58, then, as shown in FIG. 13C, side gap sheet 66 adheres to and thus remains on second side surface 481d of the first green chip, second outer side surface 481i of the first green chip, second side surface 482d of the second green chip and second outer side surface 482i of the second green chip located at the upper surface of each of the plurality of partially formed fourth chips 461.

Figure 14A:
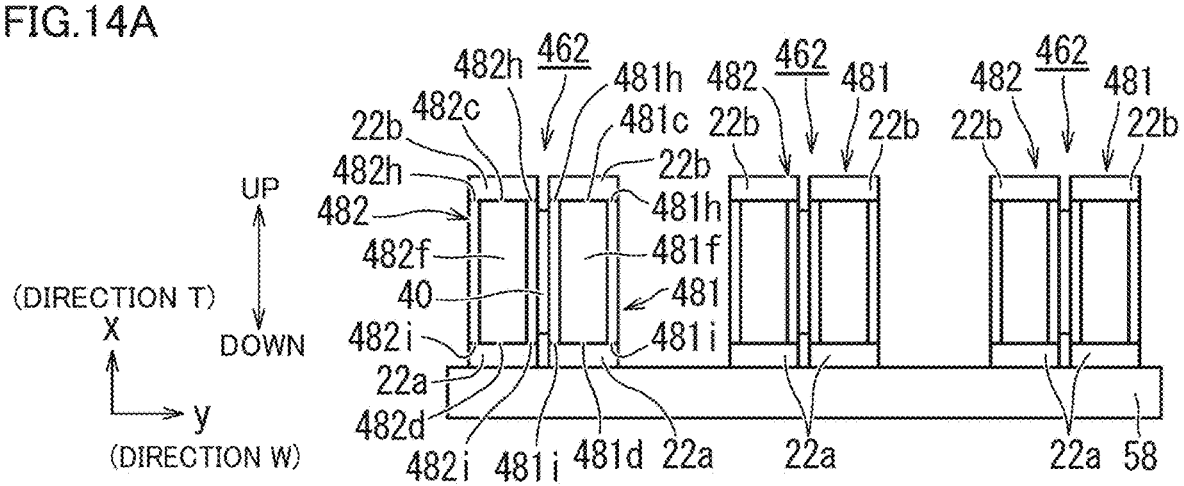
FIGS. 14A to 14C are diagrams showing a method for manufacturing a multilayer ceramic electronic component according to a preferred embodiment of the present invention.

When side gap sheet 66 adhering to and thus remaining on second side surface 481d of the first green chip, second outer side surface 481i of the first green chip, second side surface 482d of the second green chip and second outer side surface 482i of the second green chip located at the upper surface of each of the plurality of partially formed fourth chips 461 is dried, second side gap 22b covers at least a portion of second side surface 481d of the first green chip, second outer side surface 481i of the first green chip, second side surface 482d of the second green chip and second outer side surface 482i of the second green chip located at the upper surface of each of the plurality of partially formed fourth chips 461, as shown in FIG. 14A. Note that second side gap 22*b* may entirely cover second side surface 481*d* of the first green chip, second outer side surface 481*i* of the first green chip, second side surface 482*d* of the second green chip, and second outer side surface 482*i* of the second green chip located at the upper surface of each of the plurality of partially formed fourth chips 461.

Partially formed fourth chip 461 including second side gap 22*b* that covers at least a portion of second side surface 481*d* of the first green chip, second outer side surface 481*i* of the first green chip, second side surface 482*d* of the second green chip, and second outer side surface 482*i* of the second green chip will hereinafter be referred to as a fourth chip 462 having both surfaces formed.

As shown in FIGS. 13A to 13C, partially formed fourth chip 461 includes first side gap 22*a* that covers at least a portion of first side surface 481*c* of the first green chip, first outer side surface 481*h* of the first green chip, first side surface 482*c* of the second green chip, and first outer side surface 482*h* of the second green chip.

Figure 14B:
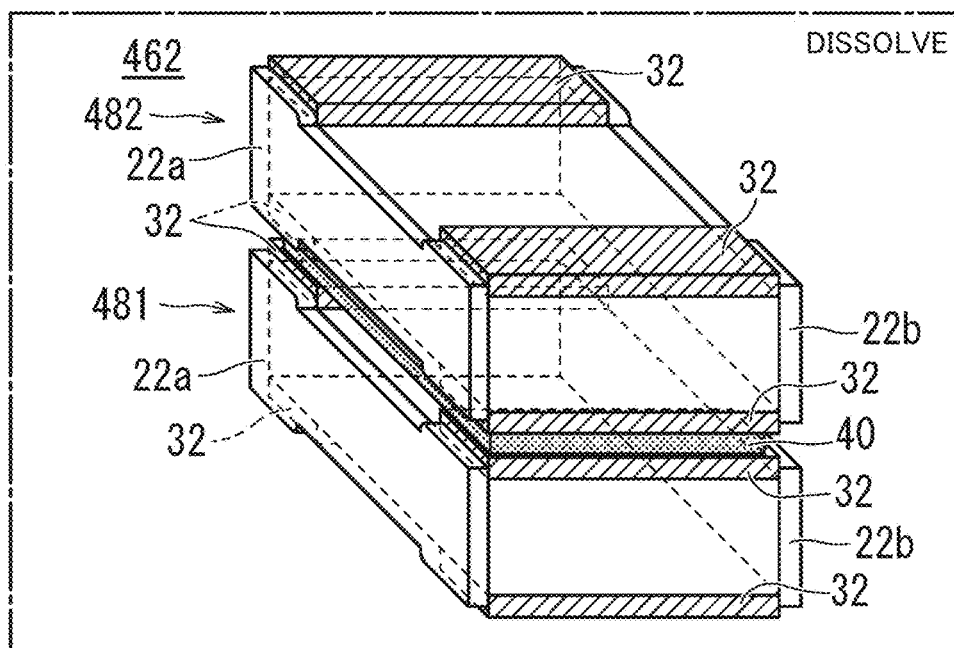

Therefore, as shown in FIGS. 14A and 14B, fourth chip 462 having both surfaces formed includes first side gap 22*a* that covers at least a portion of first side surface 481*c* of the first green chip, first outer side surface 481*h* of the first green chip, first side surface 482*c* of the second green chip, and first outer side surface 482*h* of the second green chip, and includes second side gap 22*b* that covers at least a portion of second side surface 481*d*, second outer side surface 481*i* of the first green chip, second side surface 482*d* of the second green chip and second outer side surface 482*i* of the second green chip.

Note, however, that fourth chip 462 including both surfaces formed may include first side gap 22*a* that entirely or substantially entirely covers first side surface 481*c* of the first green chip, first outer side surface 481*h* of the first green chip, first side surface 482*c* of the second green chip and first outer side surface 482*h* of the second green chip, and may include second side gap 22*b* that entirely or substantially entirely covers second side surface 481*d*, second outer side surface 481*i* of the first green chip, second side surface 482*d* of the second green chip, and second outer side surface 482*i* of the second green chip.

As shown in FIGS. 14A and 14B, fourth chip 462 including both surfaces formed includes first green chip 481 and second green chip 482.

Furthermore, adhesive film 40 is placed on first major surface 481*a* of the first green chip defining fourth chip 462 including both surfaces formed, and second major surface 482*b* of the second green chip is placed on film 40.

As shown in FIGS. 14A and 14B, first green chip 481 included in fourth chip 462 including both surfaces formed includes first side gap 22*a* that covers at least a portion of first side surface 481*c* of the first green chip and first outer side surface 481*h* of the first green chip, and includes second side gap 22*b* that covers at least a portion of second side surface 481*d* of the first green chip and second outer side surface 481*i* of the first green chip.

As shown in FIGS. 14A and 14B, second green chip 482 included in fourth chip 462 including both surfaces formed includes first side gap 22*a* that covers at least a portion of first side surface 482*c* of the second green chip and first outer side surface 482*h* of the second green chip, and includes second side gap 22*b* at least a portion of covers at least a portion of second side surface 482*d* of the second green chip and second outer side surface 482*i* of the second green chip.

As shown in FIGS. 14A and 14B, first green chip 481 included in fourth chip 462 including both surfaces formed may include first side gap 22*a* that entirely or substantially entirely covers first side surface 481*c* of the first green chip and first outer side surface 481*h* of the first green chip, and second side gap 22*b* that entirely or substantially entirely covers second side surface 481*d* of the first green chip and second outer side surface 481*i* of the first green chip.

As shown in FIGS. 14A and 14B, second green chip 482 included in fourth chip 462 including both surfaces formed may include first side gap 22*a* that entirely or substantially entirely covers first side surface 482*c* of the second green chip and first outer side surface 482*h* of the second green chip, and second side gap 22*b* that entirely or substantially entirely covers second side surface 482*d* of the second green chip and second outer side surface 482*i* of the second green chip.

As shown in FIG. 14B, together with fourth chip 462 including both surfaces formed, adhesive film 40 is immersed in water to dissolve adhesive film 40 located between first major surface 481*a* of the first green chip and second major surface 482*b* of the second green chip to thus separate first green chip 481 and second green chip 482. In doing so, adhesive film 40 dissolved into small pieces (or burr) may ultrasonically be washed away.

Figure 14C:
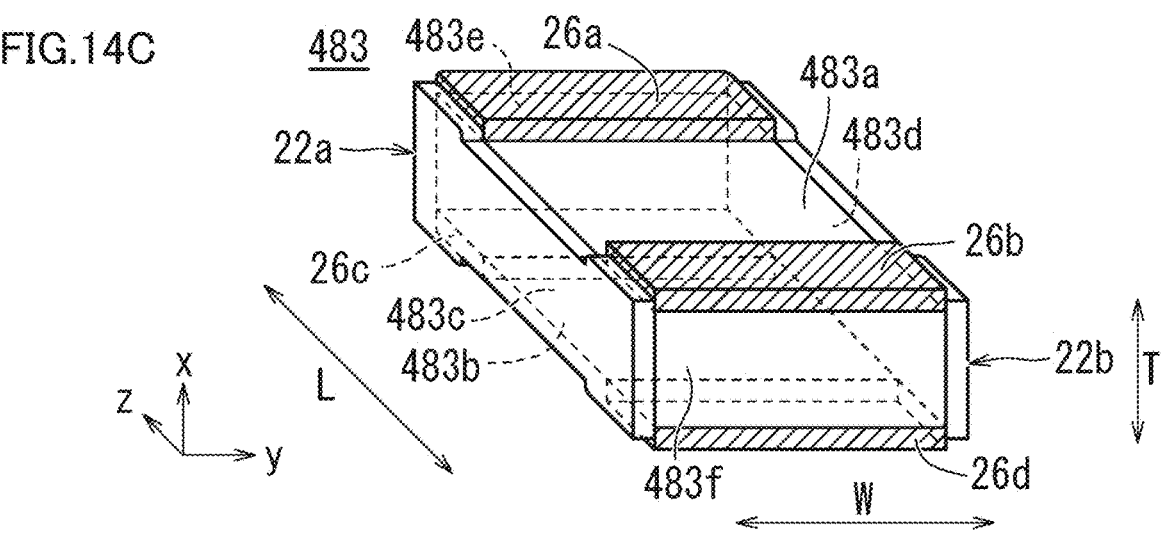

Now that first green chip 481 and second green chip 482 are separated from each other, first green chip 481 and second green chip 482 will hereinafter each be referred to as a green chip 483 having both surfaces formed, as shown in FIG. 14C.

As shown in FIG. 14C, for green chip 483 including both surfaces formed, direction x is a layer stacking direction (or direction T), direction y is a widthwise direction (or direction W), and direction z is a lengthwise direction (or direction L). Green chip 483 having both surfaces formed includes a first major surface 483*a* and a second major surface 483*b* opposite to each other in the layer stacking direction (or direction T), a first side surface 483*c* and a second side surface 483*a* opposite to each other in the widthwise direction (or direction W), and a first end surface 483*e* and a second end surface 483*f* opposite to each other in the lengthwise direction (or direction L).

Figure 15A:
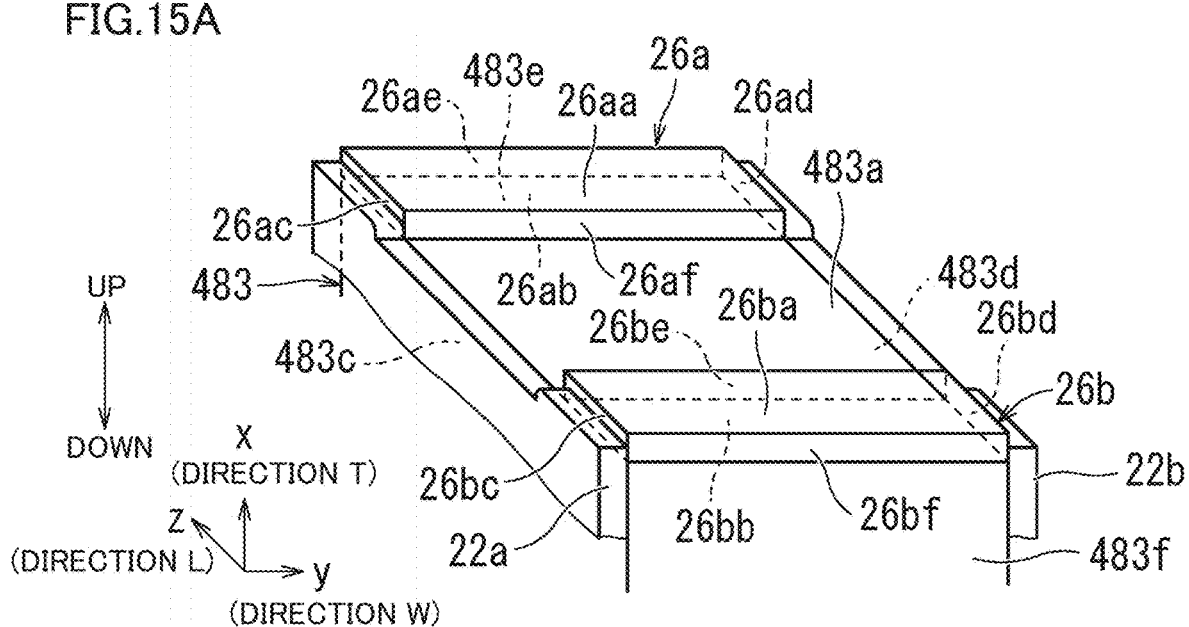
FIG. 15A is a perspective view on the side of a first major surface of a green chip having both surfaces formed.
Figure 15B:
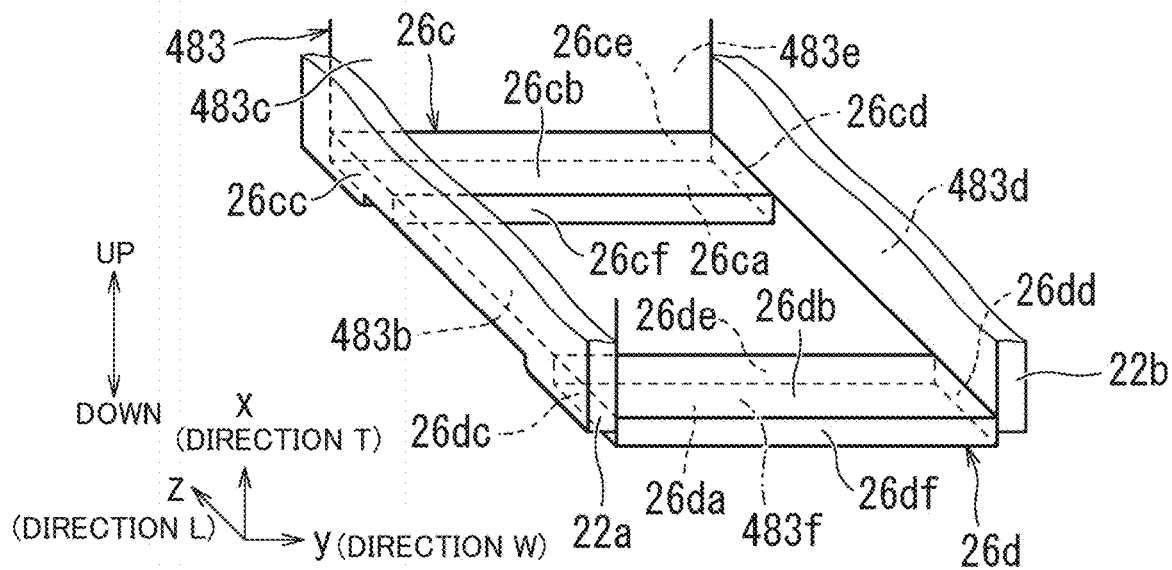
FIG. 15B is a perspective view on the side of a second major surface of the green chip having both surfaces formed.

As shown in FIGS. 14C, 15A, and 15B, first major surface electrode 26*a* is located on first major surface 483*a* of the green chip including both surfaces formed on the side of first end surface 483*e* of the green chip having both surfaces formed.

As shown in FIGS. 14C, 15A, and 15B, second major surface electrode 26*b* is located on first major surface 483*a* of the green chip including both surfaces formed on the side of second end surface 483*f* of the green chip having both surfaces formed.

As shown in FIGS. 14C, 15A, and 15B, third major surface electrode 26*c* is located on second major surface 483*b* of the green chip including both surfaces formed on the side of first end surface 483*e* of the green chip having both surfaces formed.

As shown in FIGS. 14C, 15A, and 15B, fourth major surface electrode 26*d* is located on second major surface 483*b* of the green chip including both surfaces formed on the side of second end surface 483*f* of the green chip having both surfaces formed.

As shown in FIGS. 14C, 15A, and 15B, green chip 483 including both surfaces formed includes first side gap 22*a* that covers at least a portion of first side surface 483c of the green chip having both surfaces formed, first side surface 26ac of the first major surface electrode, first side surface 26bc of the second major surface electrode, first side surface 26cc of the third major surface electrode, and first side surface 26dc of the fourth major surface electrode, and includes second side gap 22b that covers at least a portion of second major surface 483b of the green chip having both surfaces formed, second side surface 26ad of the first major surface electrode, second side surface 26bd of the second major surface electrode, second side surface 26cd of the third major surface electrode, and second side surface 26dd of the fourth major surface electrode.

Note, however, that green chip 483 including both surfaces formed may include first side gap 22a that entirely or substantially entirely covers first side surface 483c of the green chip including both surfaces formed, first side surface 26ac of the first major surface electrode, first side surface 26bc of the second major surface electrode, first side surface 26cc of the third major surface electrode, and first side surface 26dc of the fourth major surface electrode, and may include second side gap 22b that entirely or substantially entirely covers second major surface 483b of the green chip including both surfaces formed, second side surface 26ad of the first major surface electrode, second side surface 26bd of the second major surface electrode, second side surface 26cd of the third major surface electrode, and second side surface 26dd of the fourth major surface electrode.

Subsequently, green chip 483 including both surfaces formed undergoes wet G barreling to remove foreign matters adhering to a surface of green chip 483 including both surfaces formed.

Furthermore, subsequently, an end surface electrode is applied. Specifically, for example, a dipping method is used to apply a first end surface electrode 28a on a first end surface 483e of the green chip including both surfaces formed to form first end surface electrode 28a on first end surface 483e of the green chip having both surfaces formed, and the dipping method is used to apply second end surface electrode 28b on a second end surface 483f of the green chip including both surfaces formed to form second end surface electrode 28b on second end surface 483f of the green chip having both surfaces formed.

First end surface electrode 28a is formed on first end surface 483e of green chip 483 including both surfaces formed, and second end surface electrode 28b is formed on second end surface 483f of green chip 483 having both surfaces formed.

Thereafter, green chip 483 including both surfaces formed is fired.

Subsequently, wet F-barreling is applied to green chip 483 including both surfaces formed to significantly increase Ni coverage on a surface of first external electrode 24a and that of second external electrode 24b to thereby provide platability to first external electrode 24a and second external electrode 24b.

Furthermore, thereafter, a Cu plating layer is formed.

The Cu plating layer is formed by, for example, the steps of Cu plating, vacuum heat treatment, and Cu plating heat treatment.

Initially, first external electrode 24a and second external electrode 24b undergo Cu plating to form a Cu plating layer.

Subsequently, green chip 483 including both surfaces formed is subjected to vacuum heat treatment to significantly reduce or prevent swelling of first external electrode 24a and second external electrode 24b.

Subsequently, first external electrode 24a and second external electrode 24b are subjected to Cu plating heat treatment to significantly increase adhesive force by inter-diffusion of Ni—Cu to thereby significantly increase reliability by removal of a plating solution.

Thereafter, first external electrode 24a and second external electrode 24b provided with the Cu plating layer are subjected to Ni/Sn plating and thus provided with a Ni/Sn plating layer.

Subsequently, pre-measurement reject screening is performed. In the pre-measurement reject screening, any green chip 483 including both surfaces formed that adheres to another green chip 483 including both surfaces formed, or any green chip 483 including both surfaces formed that almost cracks is removed. Note that the pre-measurement reject screening is performed only for T=about 0.15 or less.

Finally, measurement and appearance screening are performed to manufacture multilayer ceramic capacitor 10.

After multilayer ceramic capacitor 10 is completed, as shown in FIGS. 1 to 3B, green chip 483 including both surfaces formed defines multilayer body 12 including first major surface 12a on which first major surface electrode 26a and second major surface electrode 26b are located, second major surface 12b on which third major surface electrode 26c and fourth major surface electrode 26d are located, first side surface 12c with first side gap 22a formed thereon, and second side surface 12d with second side gap 22b formed thereon.

Furthermore, after multilayer ceramic capacitor 10 is completed, as shown in FIGS. 1 to 3B, first major surface electrode 26a, third major surface electrode 26c, and first end surface electrode 28a define first external electrode 24a, and second major surface electrode 26b, fourth major surface electrode 26d, and second end surface electrode 28b define second external electrode 24b.

According to the method for manufacturing a multilayer ceramic electronic component according to a preferred embodiment of the present invention, since the plurality of multilayer bodies 12 are stacked via a binder, the component is easily rotated, and a side margin is easily formed on a side surface.

In order to describe a function of multilayer ceramic capacitor 10, a multilayer ceramic capacitor 1 of a comparative example will be compared with multilayer ceramic capacitor 10.

Figure 16A:
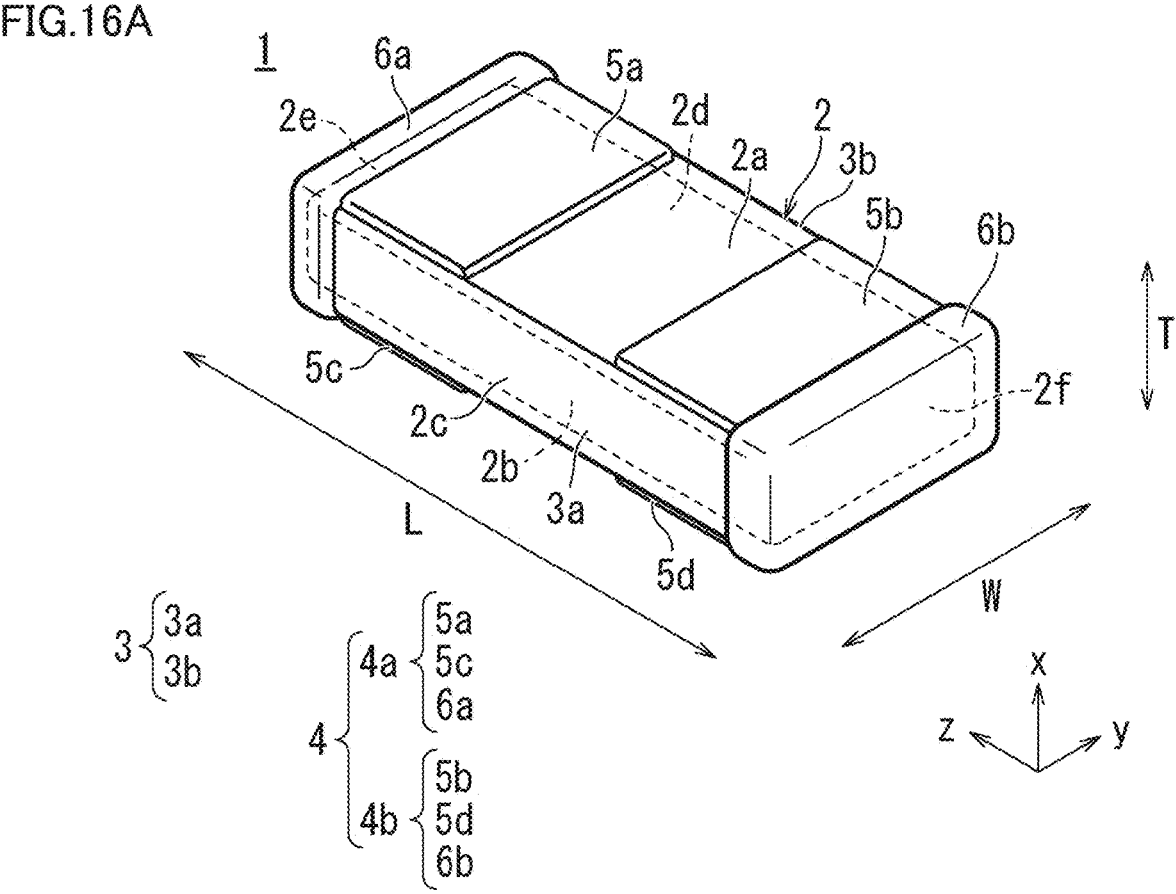
FIG. 16A is a perspective view of a multilayer ceramic capacitor of a comparative example.

As shown in FIG. 16A, multilayer ceramic capacitor 1 of the comparative example includes a multilayer body 2, a side gap 3, and an external electrode 4.

As shown in FIG. 16A, for multilayer body 2, direction x is a layer stacking direction (or direction T), direction y is a widthwise direction (or direction W), and direction z is a lengthwise direction (or direction L). Multilayer body 2 includes a plurality of stacked ceramic layers and a plurality of stacked internal electrode layers, and includes a first major surface 2a and a second major surface 2b opposite to each other in the layer stacking direction (or direction T), a first side surface 2c and a second side surface 2d opposite to each other in the widthwise direction (or direction W), and a first end surface 2e and a second end surface 2f opposite to each other in the lengthwise direction (or direction L).

Multilayer body 12 includes the plurality of internal electrode layers opposite to one another in the layer stacking direction (or direction T), and the ceramic layer provided between the internal electrode layers.

The plurality of stacked internal electrode layers include a plurality of first internal electrode layers and a plurality of second internal electrode layers.

The first internal electrode layers and the plurality of second internal electrode layers are alternately stacked.

The first internal electrode layer includes an end thereof led out to first end surface 2e and thus exposed.

The second internal electrode layer includes an end thereof led out to second end surface 2f and thus exposed.

As shown in FIG. 16A, external electrode 4 includes a first external electrode 4a and a second external electrode 4b.

First external electrode 4a includes a first major surface electrode 5a, a third major surface electrode 5c, and a first end surface electrode 6a.

Second external electrode 4b includes a second major surface electrode 5b, a fourth major surface electrode 5d, and a second end surface electrode 6b.

For first major surface electrode 5a, second major surface electrode 5b, third major surface electrode 5c, and fourth major surface electrode 5d, direction x is a vertical direction (or direction T), direction y is a widthwise direction (or direction W), and direction z is a lengthwise direction (or direction L).

As shown in FIG. 16A, first major surface electrode 5a has a rectangular parallelepiped or substantially rectangular parallelepiped shape, and located on first major surface 2a on the side of first end surface 2e.

Figure 16B:
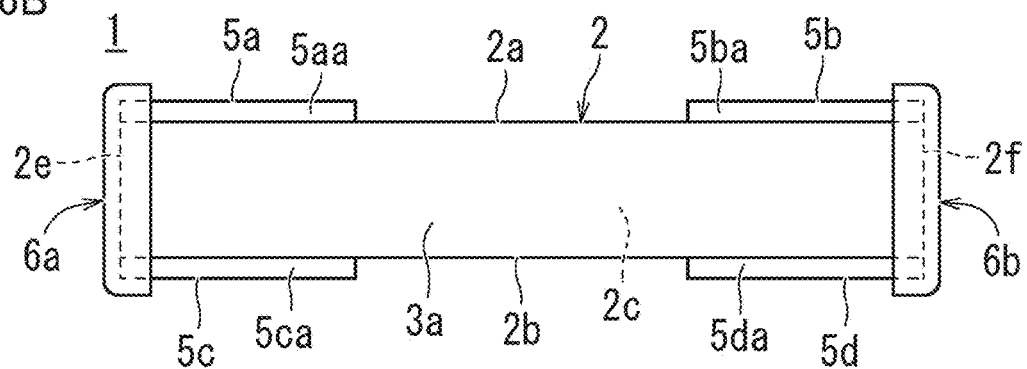
FIG. 16B is a side view on the side of a first side surface of the multilayer ceramic capacitor of the comparative example.
Figure 16C:
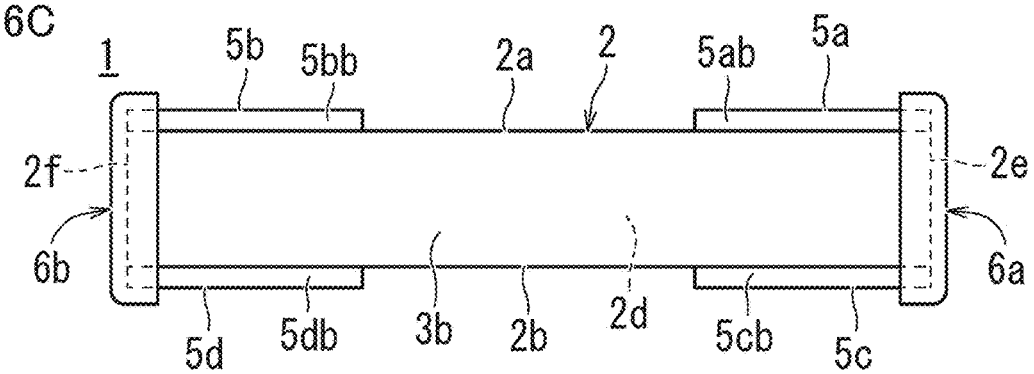
FIG. 16C is a side view on the side of a second side surface of the multilayer ceramic capacitor of the comparative example.

As shown in FIGS. 16B and 16C, first major surface electrode 5a includes a first side surface 5aa and a second side surface 5ab opposite to each other in direction y (or direction W).

As shown in FIG. 16A, second major surface electrode 5b has a rectangular parallelepiped or substantially rectangular parallelepiped shape and is located on first major surface 2a on the side of second end surface 2f.

As shown in FIGS. 16B and 16C, second major surface electrode 5b includes a first side surface 5ba and a second side surface 5bb opposite to each other in direction y (or direction W).

As shown in FIG. 16A, third major surface electrode 5c has a rectangular parallelepiped or substantially rectangular parallelepiped shape and located on second major surface 2b on the side of first end surface 2e.

As shown in FIGS. 16B and 16C, third major surface electrode 5c includes a first side surface 5ca and a second side surface 5cb opposite to each other in direction y (or direction W).

As shown in FIGS. 16A to 16C, fourth major surface electrode 5d has a rectangular parallelepiped or substantially rectangular parallelepiped shape and located on second major surface 2b on the side of second end surface 2f.

As shown in FIGS. 16A to 16C, fourth major surface electrode 5d includes a first side surface 5da and a second side surface 5db opposite to each other in direction y (or direction W).

As shown in FIGS. 16A to 16C, first end surface electrode 6a is located on first end surface 2e and electrically connected to first major surface electrode 5a, third major surface electrode 5c, and the first internal electrode layer.

As shown in FIGS. 16A to 16C, second end surface electrode 6b is located on second end surface 2f and electrically connected to second major surface electrode 5b, fourth major surface electrode 5d, and the second internal electrode layer.

A side gap 3 includes a first side gap 3a and a second side gap 3b.

In multilayer ceramic capacitor 1 of the comparative example, as shown in FIGS. 16A to 16C, first side gap 3a covers at least a portion of first side surface 2c of multilayer body 2, and second side gap 3b covers at least a portion of second side surface 2d of multilayer body 2.

In multilayer ceramic capacitor 1 of the comparative example, however, as shown in FIGS. 16A to 16C, first side gap 3a does not cover first side surface 5aa of the first major surface electrode, first side surface 5ba of the second major surface electrode, first side surface 5ca of the third major surface electrode, and first side surface 5da of the fourth major surface electrode, and second side gap 3b does not cover second side surface 5ab of the first major surface electrode, second side surface 5bb of the second major surface electrode, second side surface 5cb of the third major surface electrode and second side surface 5db of the fourth major surface electrode.

When a thin multilayer ceramic capacitor 10 having a small dimension T relative to dimension W is bent in direction x, it easily deflects in direction x.

However, when multilayer ceramic capacitor 10 according to the present preferred embodiment and multilayer ceramic capacitor 1 according to the comparative example are bent, multilayer ceramic capacitor 10 according to the present preferred embodiment less easily deflects and thus cracks than multilayer ceramic capacitor 1 according to the comparative example.

This point will be described below.

Multilayer ceramic capacitor 10 according to the present preferred embodiment is compared with multilayer ceramic capacitor 1 of the comparative example.

As shown in FIGS. 1, 3A, and 3B, multilayer ceramic capacitor 10 according to the present preferred embodiment includes first side gap 22a located on the side of first side surface 12c and covering at least a portion of first side surface 12c, first side surface 26ac of the first major surface electrode, first side surface 26bc of the second major surface electrode, first side surface 26cc of the third major surface electrode, and first side surface 26dc of the fourth major surface electrode.

As shown in FIGS. 1, 3A, and 3B, multilayer ceramic capacitor 10 of the present preferred embodiment includes second side gap 22b located on the side of second side surface 12d and covering at least a portion of second side surface 12d, second side surface 26ad of the first major surface electrode, second side surface 26bd of the second major surface electrode, second side surface 26cd of the third major surface electrode, and second side surface 26dd of the fourth major surface electrode.

In contrast, multilayer ceramic capacitor 1 of the comparative example, as shown in FIGS. 16A to 16C, includes first side gap 3a covering at least a portion of first side surface 2c of multilayer body 2 and second side gap 3b covering at least a portion of second side surface 2d of multilayer body 2.

Note, however, that multilayer ceramic capacitor 1 of the comparative example, as shown in FIGS. 16A to 16C, includes first side gap 3a without covering first side surface 5aa of the first major surface electrode, first side surface 5ba of the second major surface electrode, first side surface 5ca of the third major surface electrode, and first side surface 5da of the fourth major surface electrode, and includes second side gap 3b without covering second side surface 5ab of the first major surface electrode, second side surface 5bb of the second major surface electrode, second side surface 5cb of the third major surface electrode, and second side surface 5db of the fourth major surface electrode.

Thus, a range in which first side gap 22a of multilayer ceramic capacitor 10 according to the present preferred embodiment covers multilayer ceramic capacitor 10 according to the present preferred embodiment on the side of first side surface 12c is larger than a range in which first side gap 3a of multilayer ceramic capacitor 1 according to the comparative example covers multilayer ceramic capacitor 1 according to the comparative example on the side of first side surface 2c, and a range in which second side gap 22b of multilayer ceramic capacitor 10 according to the present preferred embodiment covers multilayer ceramic capacitor 10 according to the present preferred embodiment on the side of second side surface 12d is larger than a range in which second side gap 3b of multilayer ceramic capacitor 1 according to the comparative example covers multilayer ceramic capacitor 1 according to the comparative example on the side of second side surface 2d.

Therefore, multilayer ceramic capacitor 10 of the present preferred embodiment has larger strength against bending than multilayer ceramic capacitor 1 of the comparative example, and when multilayer ceramic capacitor 10 of the present preferred embodiment and multilayer ceramic capacitor 1 of the comparative example are bent, multilayer ceramic capacitor 10 of the present preferred embodiment is less likely to crack than multilayer ceramic capacitor 1 of the comparative example.

Subsequently, an example of an application of multilayer ceramic capacitor 10 will be described.

Figure 17:
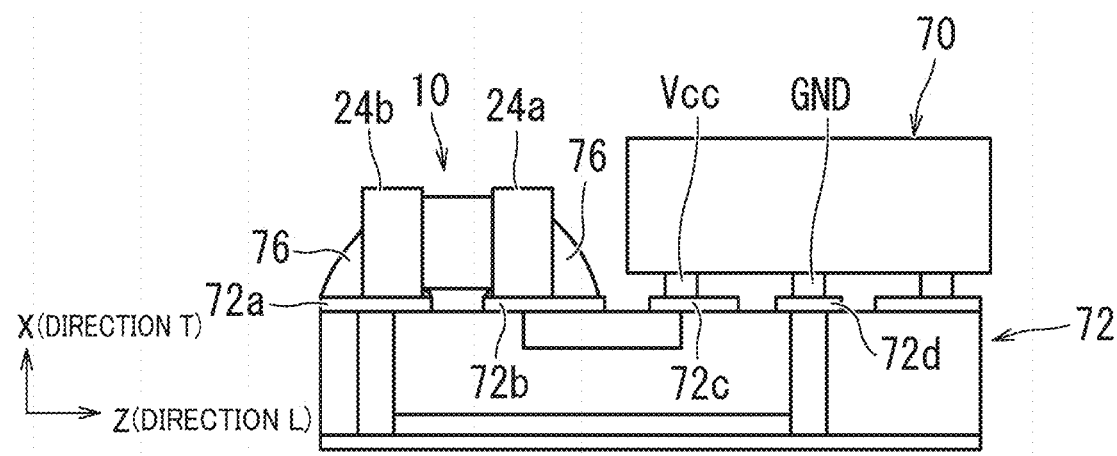
FIG. 17 shows a multilayer ceramic capacitor used on a surface of a semiconductor substrate.
Figure 18:
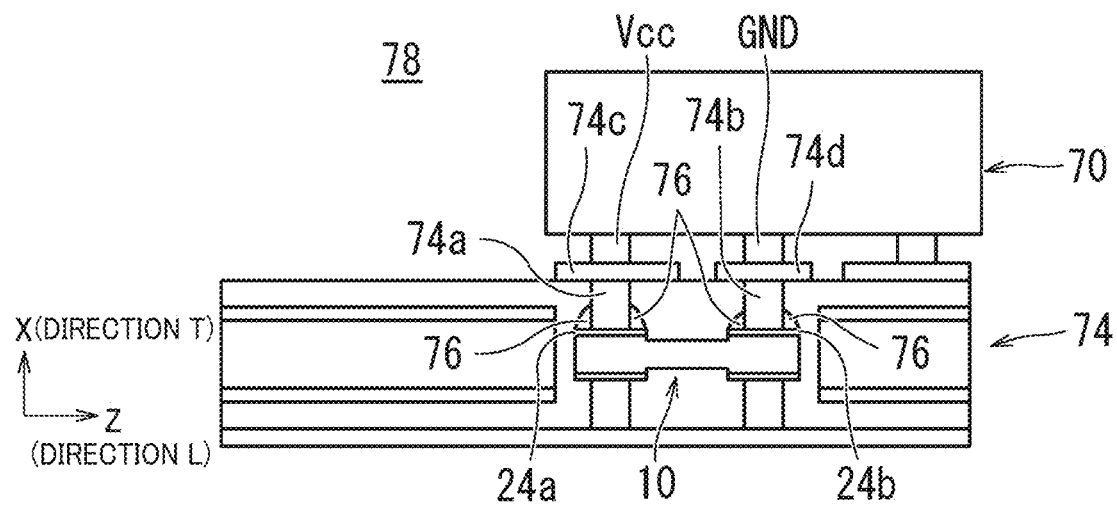
FIG. 18 shows the multilayer ceramic capacitor used inside a semiconductor substrate.

As an example of an application of multilayer ceramic capacitor 10, initially, as shown in FIG. 17, a case will be described in which multilayer ceramic capacitor 10 is soldered to and thus provided on a surface of a first semiconductor substrate including a surface on which an IC 70, multilayer ceramic capacitor 10 and the like are mounted, and furthermore, as shown in FIG. 18, a case will be described in which while IC 70 is mounted on a surface, multilayer ceramic capacitor 10 of the present preferred embodiment is accommodated inside and provided in a second semiconductor substrate 74 soldered to an internal electrode.

In FIGS. 17 and 18, a dimension in direction x (or direction T), which is a vertical direction, will be referred to as dimension T, and a dimension in direction z (or direction L), which is a lengthwise direction, will be referred to as dimension L.

As shown in FIG. 17, a case will be described in which multilayer ceramic capacitor 10 is soldered to and thus provided on a surface of first semiconductor substrate 72 on which IC 70, multilayer ceramic capacitor 10, and the like are mounted.

As shown in FIG. 17, first semiconductor substrate 72 includes on an external surface thereof a first surface electrode 72a, a second surface electrode 72b, a third surface electrode 72c, and a fourth surface electrode 72d. First surface electrode 72a is electrically connected to third surface electrode 72c inside first semiconductor substrate 72, and second surface electrode 72b is electrically connected to fourth surface electrode 72d inside first semiconductor substrate 72.

As shown in FIGS. 17 and 18, IC 70 includes on an external surface thereof a positive electrode Vcc and a negative electrode GND.

As shown in FIG. 17, multilayer ceramic capacitor 10 includes first external electrode 24a soldered 76 and thus electrically connected to first surface electrode 72a and includes second external electrode 24b soldered 76 and thus electrically connected to second surface electrode 72b, and IC 70 includes positive electrode Vcc electrically connected to third surface electrode 72c and includes negative electrode GND electrically connected to fourth surface electrode 72d. Therefore, multilayer ceramic capacitor 10 includes first external electrode 24a electrically connected to positive electrode Vcc of IC 70 and second external electrode 24b electrically connected to negative electrode GND of IC 70.

As shown in FIG. 17, multilayer ceramic capacitor 10 may include first external electrode 24a soldered 76 and thus electrically connected to first surface electrode 72a, and second external electrode 24b soldered 76 and thus electrically connected to second surface electrode 72b.

As shown in FIG. 18, a case will be described in which while IC 70 is mounted on a surface, multilayer ceramic capacitor of the present preferred embodiment is incorporated inside second semiconductor substrate 74 and soldered 76 to an internal electrode.

Second semiconductor substrate 74 internally includes a first intra-substrate electrode 74a and a second intra-substrate electrode 74b, and includes on a surface thereof a first extra-substrate electrode 74c and a second extra-substrate electrode 74d.

First intra-substrate electrode 74a is electrically connected to first extra-substrate electrode 74c inside second semiconductor substrate 74, and second intra-substrate electrode 74b is electrically connected to second extra-substrate electrode 74d inside second semiconductor substrate 74.

As shown in FIG. 18, multilayer ceramic capacitor 10 according to the present preferred embodiment includes first external electrode 24a soldered 76 and thus electrically connected to first intra-substrate electrode 74a and includes second external electrode 24b soldered 76 and thus electrically connected to second intra-substrate electrode 74b, and IC 70 includes positive electrode Vcc electrically connected to first extra-substrate electrode 74c and includes negative electrode GND electrically connected to second extra-substrate electrode 74d. Therefore, multilayer ceramic capacitor 10 includes first external electrode 24a electrically connected to positive electrode Vcc of IC 70 and includes second external electrode 24b electrically connected to negative electrode GND of IC 70.

As shown in FIG. 18, second semiconductor substrate 74 in which multilayer ceramic capacitor 10 according to the present preferred embodiment is incorporated and includes first external electrode 24a soldered 76 and thus electrically connected to first intra-substrate electrode 74a and second external electrode 24b soldered 76 and thus electrically connected to second intra-substrate electrode 74b, is referred to as an incorporation substrate 78.

It should be noted that although preferred embodiments of the present invention are provided in the above description, the present invention is not limited thereto.

That is, various modifications in mechanism, shape, material, number and amount, position, arrangement, and the like may be applied to the above-described preferred embodiment without departing from the technological idea of the present invention and the scope of the object of the present invention, and are encompassed in the present invention.

That is, while a dielectric ceramic material is included as a material for the ceramic layer of the multilayer body in the above-described preferred embodiment and examples, in the present invention, depending on the type of the multilayer ceramic electronic component, a magnetic ceramic material, for example, ferrite, a semiconductor ceramic material, for example, a spinel ceramic material, or a piezoelectric ceramic material, for example, PZT ceramic material are also able to be included as a material for the ceramic body.

The multilayer ceramic electronic component defines and functions as a multilayer ceramic inductor, a multilayer ceramic thermistor, and a multilayer ceramic piezoelectric component when a magnetic ceramic material, a semiconductor ceramic material and a piezoelectric ceramic material, respectively, are included as a material for the ceramic layer of the multilayer body. Note that when the multilayer ceramic electronic component defines and function as a multilayer ceramic inductor, the internal electrode layer will be a conductor in a coil shape.

Multilayer ceramic electronic components according to preferred embodiments of the present invention are suitably provided, for example, as a multilayer ceramic capacitor, a multilayer ceramic inductor, a multilayer ceramic thermistor, and a multilayer ceramic piezoelectric component, in particular.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing a multilayer ceramic electronic component, the method comprising:
   preparing a plurality of the multilayer bodies each including a plurality of stacked ceramic layers and including a first major surface and a second major surface opposite to each other in a layer stacking direction, a first side surface and a second side surface opposite to each other in a widthwise direction substantially orthogonal to the layer stacking direction, and a first end surface and a second end surface opposite to each other in a lengthwise direction substantially orthogonal to the layer stacking direction and the widthwise direction;
   stacking the plurality of multilayer bodies by adhering a binder between respective major surfaces of at least two of the plurality of the multilayer bodies;
   rotating the stacked plurality of multilayer bodies concurrently by about 90° with the lengthwise direction defining and functioning as an axis of rotation;
   providing a side gap portion on at least a portion of the first side surface or the second side surface of the plurality of multilayer bodies; and
   removing the binder from the plurality of multilayer bodies after being provided with the side gap portion to provide the multilayer ceramic electronic component; wherein
   the multilayer ceramic electronic component includes a length of a dimension T in the layer stacking direction and a length of a dimension W in the widthwise direction; and
   the dimension T is smaller than the dimension W.

2. The method for manufacturing a multilayer ceramic electronic component according to claim 1, wherein the dimension T of the multilayer ceramic electronic component is not less than 0.08 mm and not more than 0.15 mm, and the dimension W of the multilayer ceramic electronic component is not less than twice the dimension T.

3. The method for manufacturing a multilayer ceramic electronic component according to claim 1, wherein
   the binder is a water-soluble film; and
   the removing the binder includes dissolving the water-soluble film with water.

4. The method for manufacturing a multilayer ceramic electronic component according to claim 1, wherein the preparing the plurality of multilayer bodies includes screen-printing an external electrode on at least one of the first and second major surfaces of the multilayer bodies.

5. The method for manufacturing a multilayer ceramic electronic component according to claim 1, further comprising forming an end surface electrode by a dipping method after the step of removing the binder.

6. The method for manufacturing a multilayer ceramic electronic component according to claim 1, wherein each of the multilayer bodies has a substantially rectangular parallelepiped shape.

7. The method for manufacturing a multilayer ceramic electronic component according to claim 1, wherein
   the preparing the plurality of the multilayer bodies includes forming a first internal electrode layer and a forming second internal electrode layer; and
   at least one of the plurality of stacked ceramic layers is provided between the first internal electrode layer and the second internal electrode layer in a stacking direction of the plurality of stacked ceramic layers.

8. The method for manufacturing a multilayer ceramic electronic component according to claim 7, wherein
   the first internal electrode layer includes a first opposite electrode portion and a first lead electrode portion;
   the second internal electrode layer includes a second opposite electrode portion and a second lead electrode portion; and
   the first opposite electrode portion and the second opposite electrode portion face one another.

9. The method for manufacturing a multilayer ceramic electronic component according to claim 8, further comprising:
   forming a first external electrode on the first end surface and forming a second external electrode on the second end surface; wherein
   the first lead electrode portion is electrically connected to the first external electrode; and
   the second lead electrode portion is electrically connected to the second external electrode.

10. The method for manufacturing a multilayer ceramic electronic component according to claim 7, further comprising:
    forming a first external electrode on the first end surface and forming a second external electrode on the second end surface; wherein
    the forming the first internal electrode layer includes forming a plurality of first internal electrode layers, and the forming the second internal electrode layer includes forming a plurality of second internal electrode layers.

11. The method for manufacturing a multilayer ceramic electronic component according to claim 1, wherein at least one of the plurality of stacked ceramic layers includes a dielectric material.

12. The method for manufacturing a multilayer ceramic electronic component according to claim 1, wherein the providing the side gap portion includes providing a first side gap portion that covers at least a portion of the first side surface and providing a second side gap portion that covers at least a portion of the second side surface.

13. The method for manufacturing a multilayer ceramic electronic component according to claim 12, wherein the first side gap portion substantially entirely covers the first side surface and the second side gap portion substantially entirely covers the second side surface.

14. The method for manufacturing a multilayer ceramic electronic component according to claim 12, further comprising:
    forming a first external electrode on the first end surface and forming a second external electrode on the second end surface; wherein the first external electrode at least partially covers the first side gap, and the second external electrode at least partially covers the second side gap.

15. The method for manufacturing a multilayer ceramic electronic component according to claim 1, wherein the side gap portion is provided by pressing a sheeting including a resin and a rubber material against the plurality of multilayer bodies.

* * * * *